(12) United States Patent
Robinson

(10) Patent No.: US 7,072,846 B1
(45) Date of Patent: Jul. 4, 2006

(54) CLUSTERS FOR RAPID ARTIST-AUDIENCE MATCHING

(75) Inventor: Gary Robinson, Bangon, ME (US)

(73) Assignee: Emergent Music LLC, Bangor, ME (US)

( * ) Notice: Subject to any disclaimer, the term of this patent is extended or adjusted under 35 U.S.C. 154(b) by 625 days.

(21) Appl. No.: 09/714,789

(22) Filed: Nov. 16, 2000

Related U.S. Application Data

(60) Provisional application No. 60/165,794, filed on Nov. 16, 1999.

(51) Int. Cl.
*G06F 17/30* (2006.01)

(52) U.S. Cl. ............................. 705/10; 706/15; 706/45; 705/7

(58) Field of Classification Search ................. 705/10, 705/7; 707/1, 3; 706/15, 45
See application file for complete search history.

(56) References Cited

U.S. PATENT DOCUMENTS

| | | | |
|---|---|---|---|
| 5,583,763 A | 12/1996 | Atcheson et al. ............... 707/3 |
| 5,749,081 A * | 5/1998 | Whiteis ....................... 707/102 |
| 5,754,939 A | 5/1998 | Herz et al. .................. 455/3.04 |
| 5,790,426 A * | 8/1998 | Robinson ..................... 702/179 |
| 5,798,785 A | 8/1998 | Hendricks et al. ............. 725/4 |
| 5,884,282 A * | 3/1999 | Robinson ..................... 705/27 |
| 6,029,161 A | 2/2000 | Lang et al. .................... 707/1 |
| 6,041,311 A * | 3/2000 | Chislenko et al. ............ 705/27 |
| 6,064,980 A * | 5/2000 | Jacobi et al. ................ 705/26 |
| 6,260,033 B1 * | 7/2001 | Tatsuoka ..................... 706/45 |
| 6,327,590 B1 * | 12/2001 | Chidlovskii et al. ........... 707/5 |
| 6,421,675 B1 * | 7/2002 | Ryan et al. .................. 707/100 |
| 6,438,579 B1 * | 8/2002 | Hosken ....................... 709/203 |
| 6,460,036 B1 * | 10/2002 | Herz ........................... 707/10 |
| 6,564,202 B1 * | 5/2003 | Schuetze et al. ............... 707/2 |
| 6,681,247 B1 * | 1/2004 | Payton ....................... 709/217 |
| 6,963,850 B1 * | 11/2005 | Bezos et al. .................. 705/26 |
| 6,985,694 B1 * | 1/2006 | De Bonet et al. .......... 455/3.01 |
| 2003/0014759 A1 * | 1/2003 | Van Stam .................... 725/97 |
| 2003/0191753 A1 * | 10/2003 | Hoch ............................ 707/3 |

OTHER PUBLICATIONS

Shardanand, Upendra. "Social Information Filtering for Music Recommendations", Massachusetts Institute of Technology, Sep. 1994.*
Shardanand, Upendra and Patti Maes. "Social Information Filtering for Music Recommendations", MIT, CHI '95 Proceedings Papers.*
Steinbach, Michael, George Karypis, and Vipin Kumar. "A Comparison of Document Clustering Techniques", Department of computer Science and Engineering, University of Minnesota, Technical Report, no date.*
Good, Nathaniel; Shafer, J. Ben; Konstan, Joseph A.; Borchers, Al; Sarwar, Badrul; Herlocker, Jon; Riedl, John. Combining Collaborative Filtering with Personal Agents for Better Recommendations. GroupLens Research Project. University of Minnesota. 1999.*
N. Tishby, F.C. Pereira, W. Bialek; "The Information Bottleneck Method"; Proc. of the $37^{th}$ Annual Allerton Conference on Communication, Control, and Computing, 1999, pp. 368-377.
Tyson, J.; "How The Old Napster Worked"; downloaded Sep. 29, 2004 from http://computer.howstuffworks.com/napster.htm/printable.

* cited by examiner

*Primary Examiner*—Tariq Hafiz
*Assistant Examiner*—J. R. Loftis
(74) *Attorney, Agent, or Firm*—Elman Technology Law, P.C.; Gerry J. Elman

(57) ABSTRACT

The centerpiece of this invention is clusters. Clusters include taste signatures, which represent the tastes of a cluster. Users are enabled to find clusters that match their tastes, and artists are enabled to find the clusters where the users are who are likely be interested in their work. Clusters thus serve as hubs of activity for particular tastes; in most embodiments ratings of items of interest to those tastes can be viewed, and various embodiments may include various means for inter-user communication so that communities of people with similar tastes are formed.

24 Claims, No Drawings

CLUSTERS FOR RAPID ARTIST-AUDIENCE MATCHING

CROSS REFERENCE TO RELATED APPLICATIONS

This application claims priority under 35 U.S.C. Section 119(e) from U.S. Provisional Patent Application 60/165,794, filed Nov. 16, 1999. The entire disclosure thereof of the above-enumerated United States Provisional Patent Application, including the specification, drawings, claims, and abstract, are considered as being part of the disclosure of this application and are herby incorporated by reference.

A portion of the disclosure of this patent document contains material which is subject to copyright protection. The copyright owner has no objection to the facsimile reproduction by anyone of the patent disclosure, as it appears in the PTO patent file or records, but otherwise reserves all copyrights whatsoever,

BRIEF SUMMARY OF THE INVENTION

The purpose of this invention is to facilitate the existence and rapid growth of a Web site (or other form of electronic service) that will distribute entertainment works to their audience more effectively than other techniques.

Online services based on this invention will

Enable artists and entertainers to more efficiently find the consumers who will most enjoy their works Enable consumers to more efficiently find artists and entertainers they will enjoy (In some embodiments) Enable consumers of similar tastes to enjoy discussions with each other, and, in some embodiments, to interact with artists.

(In some embodiments) Enable individuals to play an entrepreneurial role in connecting artists to their audience, wherein they may be paid for their success.

(In some embodiments) Enable consumers and artists to enjoy the benefits of group buying: more sales to the artist and lower cost to the consumer.

DETAILED DESCRIPTION OF THE INVENTION

Clusters: The Heart of the Invention

The centerpiece of this invention is clusters. Clusters include taste signatures, which represent the tastes of a cluster. Users are enabled to find clusters that match their tastes, and artists are enabled to find the clusters where the users are who are likely to be interested in their work. Clusters thus serve as hubs of activity for particular tastes; in most embodiments ratings of items of interest to those tastes can be viewed, and various embodiments may include various means for inter-user communication so that communities of people with similar tastes are formed.

Much of this disclosure will focus on music applications of the invention. However, this is merely for convenience, and applications to other fields, including works in the fields of writing and movies, fall equally within the scope of the invention.

It should be noted that the body of the specification makes clear that the term "cluster" is used in two distinct ways in this patent application. In the first use, it is an abstract concept which might be called a "taste-identification cluster." It is a data structure which represents certain tastes. It contains a "taste signature." It can be created by human beings or automatically by a software process. If a human being creates it, it will have an associated human "cluster initiator." It may have human "members" which "join" it. The taste signature may contain "items" or "works" which are entities such as songs that are of interest to humans.

The second use is the more traditional; for instance we cluster items together.

The usage will be clear from context.

User-Created Clusters

In the some embodiment individuals are enabled to create new clusters whenever they choose.

One reason for doing so is that they believe that there is a group of people which is not adequately served by any of the existing clusters—for instance, because the tastes of people of this group are substantially different from the tastes represented by any of the existing clusters. The person creation a cluster will be known in this description as the "cluster initiator".

Means are provided for cluster creators to specify a taste of the cluster (which in some embodiments is later combined with taste information from other users as described elsewhere in this document). In one embodiment, he does so by specifying ratings for various items which he feels will be useful in defining the taste of the cluster. For example, he might give a recording of Bob Dylan's a rating of 0.95 (on a scale of 0 to 1) and a recording of Handel's Water Music a 0.1.

In another embodiment, he simply inputs a list of items which he feels will be the ones most-liked by members of the cluster. In many cases, these will represent his personal most-liked items. In a preferred embodiment, this list is ordered according to how well each item is liked relative to the others on the list.

Some software and network systems such as Napster and Gnutella enable file sharing, where files stored in the user's computer are made available for other users to download to their own computers. Usually, the songs a user has on his computer—and thus can make available for sharing—correspond to songs the user likes. Thus, the list of files he makes available for download can usually be presumed to represent a list of his likes, and used that way in computations. In some cases, of course, users will make songs they don't like available to other users, but some embodiments view this as happening infrequently enough that such problems may be ignored.

Then when users of the system are looking for a cluster that might be suitable for them, their tastes will be compared to that of this cluster as well as the old clusters. This new one may be the most suitable for a meaningful number of people.

In preferred embodiments, each cluster will have associated with it various facilities such as threaded discussion groups, chat, instant messaging, etc. These facilities will keep the users interested and motivate them to spend more time online. Spending this time online will provide more opportunities for advertising as well as more commitment to the cluster, increasing the probability of further online purchasing.

In some embodiments individuals are responsible for "moderating" and "administrating" these various facilities. This group may contain the cluster initiator. In many cases one person will play all these roles. For convenience, this person or group will be referred to here as the "cluster administrator."

Means are provided in such embodiments such that administrators, visitors, and members can provide reviews of items such as CD's which are in the subject domain of the service. In some embodiments, only a subset of these classes of users are enabled to input reviews; for instance, administrators and members.

When an item has more than one review, the usefulness of the system is enhanced by means of presenting the reviews to users in an optimal order. In the preferred embodiment, this order is based on the similarity between the user reading reviews and the user who wrote a particular review. Reviews written by authors who are closer to the reader appear earlier in the list.

Alternatively, the order can be dependent on the similarity of the author and the tastes of the cluster through which the item's reviews have been accessed.

In addition, in some embodiments means are provided for users to rate reviews. The system can use these ratings to determine the quality of a reviewer in general and/or the degree to which each individual user likes a particular reviewer. These factors can be used together with the similarity data, or in some embodiments, without it, to determine an ordering of reviews. For example, in one embodiment orderings are generated separately based on taste and quality. Percentile rankings are then calculated for each review. The percentiles between the two lists are averaged, and a new ordered list is created based on these average percentiles.

In some embodiments a summary of each reviewer's perceived goodness (determined by means of ratings or passive data acquisition such as measuring the average time spent reading a reviewer's reviews or the relative number of times a reviewer's reviews are sought out) is displayed.

Particular embodiments can use any means to combine the above factors. For instance, geometric or arithmetic averages can be computed, with or without weights.

In some embodiments, only a limited number of reviews are presented to users. These may be the ones that would have been presented first based on the ordering techniques described above.

In some embodiments where only the "best" reviews are presented, the order in which those reviews are presented may be in date-of-creation or another order such as random.

In some embodiments, reviews are automatically (or optionally) posted to the Usenet or other publicly-available services with links back to the cluster service or the individual cluster through which the review was written. (In some embodiments, however, there is no particular association between reviews and individual clusters; rather the association is with the item or artist being reviewed, so that all reviews are available in all clusters.)

In some embodiments means are provided so the administrators are paid by users for access to their clusters. In various embodiments, these payments are one-time-only, per time period (such as monthly) or per access. Reviewers can be paid similarly for access to reviews written by that reviewer. Credit card payment mechanisms or other techniques such as micropayments can be used.

In addition, in some embodiments facilities are provided for purchasing items directly through the site (or through partner sites reached by hyperlink). In some embodiments means are provided for users to rate their satisfaction with such purchases, and in preferred embodiments display means are provided for users to see selected summaries of these ratings, such as the average rating for the cluster (including average ratings for reviews, product purchases, general satisfaction, and any other metric of cluster success).

In embodiments where users are enabled to purchase items, preferred embodiments include means for the one or more of the cluster administrators to be paid a portion of the purchase price of the items. In various embodiments, this is a fixed percentage, a percentage that various with volume or total revenues, or other variations.

In some embodiments advertising is used as an additional income stream.

In some embodiments, means are provided to enable a "group purchase" to be made wherein a number of users will purchase an item at once, thereby getting a lower price from the provider for the item. For instance, in some embodiments, means are provided for users to indicate that they would be willing to buy an item at a particular price. When enough users are willing to buy at a particular discounted price that the provider is willing to sell the item at that price, the transaction is carried through. In other embodiments, data is stored regarding the number of people who, having purchased an item by a particular artist in the past, and/or having reviewed or rated an artist at a particular level, were willing to buy a discounted item when such a deal was presented to them. This enables the system to predict an estimate of how many people are likely to buy a particular item by the same artist if offered at a discount. This enables the administrator to purchase a substantial number of copies at the item at once, at a discount, and to pass all or part of the savings on to purchasers. In some embodiments the software is able to automatically email all members of a cluster of such deals, or to screen its output to those who have bought items from that artist or very similar artists previously.

In some embodiments, users are able to provide ratings of clusters. However, in preferred embodiments, more weight is given to ratings from people whose ratings have higher calculated "representativeness." (The concept of representativeness is discussed elsewhere in this document.)

Automatically-Created Clusters

In preferred embodiments, automatically-created clusters exist instead of or in addition to user-created clusters. Note that some embodiments have the automatically-created cluster features described in this section along with a limited number of the other features of the invention which are described in this disclosure, or none of them. Automatically-created clusters have their own value independent of the other concepts described herein.

A technique for optimizing clusters based upon the principles of Shannon entropy will be described. Other techniques may be similarly applicable and also fall within the scope of the invention.

Appendix B contains instructions for creating clusters that maximize information transfer as that concept is described in the literature of Shannon entropy. The related Hartley information approach also contains information transfer calculations, and falls within the scope of the invention, but the Shannon approach is preferred.

For completeness, Appendix C gives the Python source code to a methodology that does not use information transfer. It is based upon the standard k-means clustering concept. This example is included to illustrate the wide range of clustering approaches that fall within the scope of the invention; however, the preferred embodiment uses Shannon entropy's information transfer calculations.

This disclosure uses the term "Automatically-Created" to refer not only to systems in which clusters are created by software without manual human intervention, but also to systems in which clusters are optimized by software.

In embodiments where clusters are actually created by the software, a preferred methodology is for the administrator to set the average number of songs desired per cluster. As new songs are added to the system, new clusters are automatically created such that the average number of songs remains approximately the same; the optimization process then populates the cluster. These clusters, in various embodiments, may start out empty before they are optimized, or may be initially populated with new songs or randomly chosen songs.

In order for the software to have data to base its optimizations on, user taste data must be collected. Some embodiments do this by means of allowing users to rate songs. Preferred embodiments do this by means of passive data collection. For instances, *.mp3 searches on the Gnutella network cause server to respond with a list of songs the user has made available for file sharing, which can be assumed, without too much error, to be a list of songs liked by that person. Radio UserLand does even better, broadcasting every song played by every user, allowing us to build a more detailed taste profile in a completely passive way. Various embodiments use various such means for data collection.

Some embodiments only allow recommendations or cluster information to be sent to processes that send realistic-seeming user data to the server. (For instance, most such embodiments would consider a process that continuously reports playing the same song to be unrealistic.)

One challenge is to associate data sent by particular processes with user indentifiers that users can use to log on to Web sites. Preferred embodiments accomplish that by noting the IP address the user is accessing the Web site from, and seeing what passive data source, such as a Gnutella server, exists at the same IP address. In most such embodiments the user is then asked, via the Web interface, to confirm that he is using the type of data-broadcasting process that he is apparently using and asked whether the system has permission to link that data to his Web logon ID (or cookie, or other persistent identifier). In some embodiments, such as those involving passive data collection through Radio UserLand, a publicly available user ID for the data broadcaster is available, and that same user ID can be subsequently used by the user to log on to the Web site; the server can then easily link the data.

Distributed Processing for Automatically-Created Clusters

Preferred embodiments provide means for the computational load of the cluster calculations to be spread across more than one central processing unit.

In some embodiments, this is accomplished by having completely independent processes running on the various machines which all interact with the data as stored in a database system such as the open-source InterBase product. Each process randomly chooses a song, then finds the optimal cluster to move it to. If, when it is ready to perform the move, a check in the database indicates that another process has already moved it, then it cancels the move; otherwise it updates the database. In embodiments where more than one write needs to be performed against the database to facilitate the move, these actions are normally put into a single transaction. Using this procedure, a large number of computers can work together to perform the optimization more quickly. However, a portion of the work done will be wasted because the song in question was already moved by another process. This portion will be greater as the number of processes grows. Therefore it is preferable to have a more centrally controlled model.

Embodiments with centrally controlled models need an interprocess communication (IPC) method. Preferred embodiments use open standards such as XML-RPC and SOAP, since these enable clients to be written independently using a any of variety of programming languages. In some such embodiments, a server process waits for registration messages from remote client processes. When a client initializes itself, it communicates with the IP address and port of the server process. The client logs on with a persistent logon ID, or the server gives it a session ID when it first makes contact. Then a portion of the workload is assigned to the client.

Various embodiments use various methodologies for portioning out parts of the work to the various clients. In one such embodiment, the client is sent all data needed to describe all the clusters via IPC. Then, it is assigned responsibility for a certain number of songs. It finds the best clusters for those songs. It sends that data back to the server, which subsequently updates the database. At various intervals, the cluster description data is sent again to the client, containing the results of the simultaneous work done by the various other clients.

In some other embodiments, only the data for a subset of the clusters is sent to the client. Therefore, a set of clients is responsible for any particular song. Each client determines the best destination among the clusters it has the data for. Then the degree of goodness of the best choice is returned to the server by each client; the server determines "the best of the best" and updates the database accordingly.

One danger that arises in distributed processing embodiments is that a malicious client will be created that interacts with the server exactly as if it were a legitimate client. To avert this problem, preferred embodiments keep track of the average improvement in cluster quality per song movement. (For instance, in embodiments based on information transfer, this is based on the improvement in information transfer that occurs due to the movement.) When a client suggests a movement, the improvement associated with that movement is calculated by the server. If a client's suggestions tend to involve significantly less improvement in quality than is the norm, the system has reason to believe the client was either not written correctly or may even be malicious (trying to move songs inappropriately for the benefit of specific individuals or organizations).

The preferred embodiment accomplishes this by first storing the improvement per movement for trusted clients. These may be, for instance, clients running on the same machine as the server, under control of the system administrator. As the client sends suggested movements to the server, the server determines whether the client is to be trusted.

In the preferred embodiment, a client's suggestions are not added to the database until the client has had a chance to prove itself. The server waits until it receives 100 suggestions. The average improvement is calculated. This average needs to be within a desired range relative to the trusted average; for instance, an installation might desire that the client's average must be within 10% of the trusted value. If it is not, that batch of 100 suggestions is thrown away. Each batch of 100 suggestions is tested separately, in case a malicious client tries to fool the server by being "nice" for a while, followed by malicious behavior.

Other embodiments use other techniques for screening out malicious clients. In one such technique, the value of the last 100 suggestions is averaged for each client, and the clients are subsequently ranked from least valuable to most valuable. These rankings are updated whenever new suggestions come in from a client. The last 100 suggestions from the lowest-ranking 5% (or some other number) are always ignored. Still other embodiments calculate a Bayesian estimator of the value of the next suggestion. The suggestion is counted if and only if the Bayesian estimator is within a specified range compared to the trusted client, for instance, within 1%. Other techniques are used in still further embodiments.

One particularly simple approach, used in some embodiments, is for the server to simply check that the preferred embodiment increases overall information transfer.

In some embodiments where there are so many clients that the central server does not have the processing power to check on all the clients, some clients are assigned with the task of checking that other clients are not malicious. In most such embodiments, the central server assigns these checking tasks in such a way that the assigned checking client is unknown to the possible malicious client, so there is no way for the clients to collude to trick the server.

Human Input with Automatically-Created Clusters

Preferred embodiments do not rely only on software optimization of clusters. They allow users to suggest changes. These are only made if they result in an improvement to the clustering.

For example, in one such embodiments, a Web page is made available where all the songs in a cluster are listed with checkboxes beside them. (If there are too many songs in a cluster to fit on one page, multiple pages are used. Most search engines such as Google provide fine examples of how to manage a list output when the list takes more than one page.)

There is also an entry area whether user can enter an identifier for the destination cluster. In various embodiments, an identifying number of name may be entered, or there may be a pull down list if the number of clusters is small, or a more elaborate search mechanism is used.

The user checks some of the checkboxes, specifies the destination, and indicates he is ready to continue (for instance, there may be a Continue button).

The system then determines whether the suggested movement would improve the overall clustering. For instance, in embodiments which use information transfer to measure cluster quality, the information transfer that would result if the move were completed is calculated. If it is an improvement, the transfer goes through. Otherwise, it does not, and the user is informed that the transfer didn't go through. Preferred embodiments then let the user make adjustments to his suggestion; for instance, the song listing may be presented again with the checkboxes in the state the user left them in. He can then make alterations and click Continue again.

In preferred embodiments, the user can create a new cluster as the proposed destination. It would then be initially populated with the songs he selects, if doing so increases the quality of the clustering. Many such embodiments provide a user interface whereby the user can enter songs to populate the new cluster with, without regard to their original clusters. In most such embodiments, the administrator can set an upper limit on the number of clusters that may be created in this way.

The embodiments discussed here thus join human input with computer optimization in such a way that the human input is smoothly integrated into the process. All accepted human input furthers the aim of improving the clustering.

Names for Automatically-Created Clusters

Preferred embodiments provide input means for users to name automatically-created clusters.

In one such embodiments, a page is presented in which there are 20 text input areas, each providing enough space to enter a name. When a name is entered into one of the text areas (and Submit is clicked), the name may not be removed except by an administrator for a period of one week. Next to each name is a set of radio boxes labeled "no opinion, poor, fair, good, excellent". Users can thus rate any or all of the names. User identification is carried out by means of a logon requirement, cookies, or other means; only 1 vote per user per name is allowed.

An overall rating for each name is determined by means of averaging the ratings, ignoring "no opinion" ratings.

After a name has been displayed for one week, if it is not among the top 50%, it is deleted, and any user can enter a new name.

Only one name per user at a time is accepted in the list.

At any point in time, the highest-rated name is used as the name of the cluster, displayed wherever it is convenient to display such a name. In many embodiments a cluster number is also displayed, which is constant over the life time of the cluster, and therefore may be useful when a reliable way of identifying a cluster is needed.

User-Cluster-Similarity

In most embodiments, means are provided to compute a similarity between a user and a cluster.

In the some embodiments, users provide ratings that represent their tastes. In other embodiments purchase histories are used. In other embodiments, "passive" data collection such as tracking the artists and recordings that are downloaded and/or listened to can be used. In general, any source of information which captures the user's preferences in the target domain is acceptable; this includes taking note of the music files made available for Napster, Gnutella, or other types of file sharing In some embodiments, the "taste of the cluster," its "taste signature," is defined wholly by the administrator; in others it is defined by the members or even the visitors to the cluster, or by a combination thereof. The taste signature is stored in a database on the server. In some embodiments it takes the form of a list of artists or items considered to be "liked" by the cluster; in some embodiments this list is ordered with the most-liked items appearing at the top; in some embodiments ratings are associated with items and artists, for instance, on a scale from "excellent" to "poor".

In each of these embodiments, where data from various users are combined to form the taste signature, appropriate means are used. For instance, where ratings are used, the ratings for various items and artists are averaged; in some such embodiments, a weighted average is used with the administrator having a greater weight than other users. In embodiments where ordered lists are used, means for combining include converting the lists to percentile rankings, averaging the percentile rankings for each album, and outputting a new ordered list in order of the averaged percentiles.

When a user wants to make use of the system, he usually does so by finding clusters of taste similar to theirs and, in preferred embodiments, with other positive characteristics.

In preferred embodiments, means are provided to display a list of clusters together with descriptions of each cluster supplied by the administrator. These descriptions, in various embodiments take the form of text descriptors such as "Jazz, with a focus on old-style Dixieland", categories such as "Jazz", "Garage Rock", etc. or other means of communicating the center of the cluster.

In preferred embodiments, means are provided to search for clusters which users can believe they will be interested in. In embodiments where categories are provided, users can pick a category. In some embodiments where text descriptions are provided, users can search through these descriptions using standard text-retrieval techniques in order to find clusters relevant to their tastes.

In preferred embodiments, users can specify their personal tastes, and the system automatically lists clusters where the taste signature of the cluster is near to the taste signature of the user.

In preferred embodiments, when lists of clusters are presented based on any of the search techniques mentioned above, or other search techniques, the attributes mentioned above such as category and similarity to the user viewing the list are displayed, as may other cluster attributes which apply to the given cluster.

In some embodiments, "passive" data collection methods are used in matching clusters to users. These methods involve no special input of data indicating tastes.

In some such embodiments in the field of music, customizable Internet "radio" stations are associated with some or all clusters. Such stations play a mix of recordings using TCP/IP, multicasting, and/or other protocols to send streaming audio data (with additional video in some cases) to the user's computer where it is converted into sound. The recordings which are of the most interest to a cluster will tend to be played most often; the recording of least interest to the cluster, while still being "liked" by the cluster, will be played least often. Play rates can be used to tabulate ranks for items. In some embodiments, rank data is compiled for artists instead of, or in addition to, items. In most such embodiments, the administrator determines the play lists and relative frequency of playing various artists and cuts.

This rank data is then used for searching, whether acquired through manual user action or passively. In some embodiments, users input their favorite artists (or recordings, depending on the embodiment) in order of preference. In one embodiment, rank correlation is then used to find the closest matches, by computing the rank correlation for each cluster in turn and then picking the ones with the greatest level of correlation. In preferred embodiments, further processing is done to calculate p-values relative to the rank correlations, and the p-values closest to 0 indicate the closest match. (This is preferable because p-values seamlessly incorporate the number of artists or items in common on the lists being matched, as well as the degree of similar ordering.)

In other embodiments, other means are used to measure taste similarities based on this data. In some embodiments, for instance, rank data is converted into "ratings" data by dividing the rankings into groups and considering the items (or artists) in the group of highest ranks to have the highest rating, the items (or artists) in the $2^{nd}$-highest group of ranks to have the second-highest rating, etc. (There are an equal number of groups of ranks to the number of ratings; for instance, if there is a 5-point rating scale, one embodiment would assign the top 20% of items [or artists] to the highest rating, the next 20% to the next highest rating, etc.) Then rating-based techniques such as those described in U.S. Pat. No. 5,884,282 for measuring similarity are used.

In some embodiments, other types of data than rank or ratings data are used. For instance, in some embodiments, simple counts of the number of items (or artists) in common on the two lists are used; a higher number means more similarity of taste. It should not be construed that this invention depends on the use of any particular type of this "taste signature" data.

In embodiments where we have only "presence/absence" data available, such as a Napster file list in which a particular song is either present or absent, a variety of calculations can be used. While the invention should not be construed to be limited to any particular calculations, several will be listed for purposes of example: the Ochiai, Dice, and Jaccard indices. In calculating these indices, some embodiments consider the entire list of songs to be the combination of all songs contained in either the cluster in question or the user's liked list. The presence and absence are determined corresponding to this expanded list. Some other embodiments consider the master list to be the list of songs liked by the user; other songs are ignored. Thus in such embodiments the user only has "presence" indicated; whereas the cluster will usually have a mix of presence and absence. Other embodiments do the reverse, taking the cluster's list to be the master list. Some embodiments further calculate statistical significances with respect to such indices, by making use of the statistical distribution of the used index (Snijders 1990). In all these cases a number is calculated which corresponds to the degree to which the user's list of songs matches the clusters' list of songs.

In some embodiments, passive data collection is done on the user side, in addition to, or instead of, doing so on the cluster side. In some embodiments, for example, use is made of the fact that users often have MP3, CD, streaming audio, or other types of music players on their machines. Such players can be adapted by their programmers (and, in the case of open-source players, by any competent programmer) to store playback-based taste-signature data similar to that described for customizable Internet radio stations. In some embodiments this data is stored on the user's computer; in others it is stored on a central server. As noted earlier, lists of files made available for Napster, Gnutella, or other file sharing may be used. As before, rank correlation or other means, depending upon the embodiment, are used to determine the most appropriate clusters.

In some further embodiments, recommendations generated by clusters are integrated directly into the user interfaces of the users' players. For example, in some embodiments the software residing on the server is sent the playback data for a user, finds the most appropriate cluster, and sends the player software a list of the most highly-rated recordings. These recommendations are made available to the user (in one embodiment, by means of a pull-down menu; in another, by means of a scrolling list; in other embodiments, by other means) and the user can then choose the one he wants to hear. In various embodiments additional information may be included in the display, such as the name of the artist, the length of the song, etc.; in some embodiments, it is possible to click on a feature and be transported to a World Wide Web page with information on the recording.

In some embodiments, the user's player is sent the taste signature data associated with the various clusters and makes the decision about which cluster is most appropriate. This lessens privacy concerns because no complete record of a given individual's tastes needs to exist on the server to facilitate the recommendation process.

In some embodiments, the methods described here and other methods are used to measure similarities between individual users. For instance, in some embodiments these similarities are used to determine the order in which a user views reviews written by other users; the ones by users with the most similarity to the user reading the reviews are displayed first.

Cluster Membership

In preferred embodiments, users can become members of clusters. In some embodiments, members of clusters are given special access to certain facilities like chat rooms and discussion boards. In some embodiments they are given special pricing considerations when making purchases.

In typical embodiments, cluster members are known to the system by a logon ID and password. Members can join a cluster they are visiting by indicating that they wish to join; in some embodiments this is accomplished by checking an HTML checkbox.

Goodness List

In preferred embodiments, a goodness list is associated with each cluster. This somewhat corresponds to the top-40 song lists from decades ago.

Because a typical system might have hundreds or even thousands of clusters, the goodness list associated with each cluster will be highly targeted to particular tastes.

In some embodiments, manually entered ratings, supplied by the users, are averaged or otherwise combined to form the goodness score, and songs are listed in order of score.

In preferred embodiments, the necessary data is collected passively. In preferred embodiments, this data includes the number of times each user plays each song. Players or file sharing processes communicate their passively collected data to the server by using such common interfaces as SOAP, XML-RPC, or others.

At the time this disclosure is being written Radio UserLand broadcasts this data for its users by means of XML and any process that wants access to it can do get it by reading an XML file at a particular IP address. Radio UserLand broadcasts the time each song is played by each user; this data can be compiled to obtain a frequency of playing for each song.

Preferred embodiments use such data as follows. For each user:

The number of times he has played each song in the last week (or during some other chosen time period) is computed. (Over the entire population, this results in one count per user per song.) Songs he has not played during that period are ignored in all following steps.

The user's played songs are ranked with respect to one another according to the number of plays.

A number between 0 and 1 is assigned depending on rank, in increments of 1/N, where N is the number of songs played at least once by the user. The most frequently played song has a ranking of 1, the least, a rank of 1/N. We will call these "unit ranks".

Then, for each song:

The geometric mean of the unit ranks is computed. This is done by multiplying the unit ranks, and computing the Mth root of the product, where M is the number of unit ranks that were multiplied. This geometric mean is considered to be the "goodness" of the song.

The number computed for each song as described above has two main advantages over other known approaches:

Because of the ranking process, a particular user who tries to maliciously skew the process by playing a particular song an overwhelmingly huge number of times does not end up having any greater effect than another user who played the song only a little more frequently than other songs.

By using the geometric mean to compute the goodness, the songs with the highest goodness values are the songs that most consistently achieve high play rates among users who have heard them. This consistency is important, because our aim is to create a goodness list that is very reliable. Ideally, a top-ranked song in the goodness list of a cluster will be very likely to appeal to everyone who feels an association to that cluster. Geometric means accomplish that aim.

Some embodiments take the geometric mean methodology a further step, and treat the ranks as p-values. These p-values are with respect to the null hypothesis that the song has no particular tendency to be ranked above average compared to other songs. Then, the product of these p-values has an approximately chi-square distribution with 2M degrees of freedom. So, instead of taking the Mth root, we use the chi-square distribution to calculate a resultant "combined" confidence level, represented by another p-value. This resultant p-value can then be used as the goodness. Under this goodness measurement, the songs with the highest goodness would be even more reliably liked by a user with an affinity for the cluster than using the geometric mean method.

The problem with the chi-square method is that songs with a lot of people hearing them tend to generate better confidence levels, because there is more data to generate confidence from. This prejudices that goodness measure against new songs that few people have heard, even if they play the song extremely frequently.

However, in some embodiments, it is still considered worthwhile to display the chi-square-based goodness, to be as confident as possible that the top-ranked songs will be liked by nearly anyone who hears them, even though some even better newer songs will not get the attention they deserve.

In some embodiments, more than one goodness list is displayed, usually along with text describing the advantages and disadvantages of each one. For instance, once such embodiment displays the chi-square-based list with the heading "Old Reliable—You'll Be Sure To Like The Top Listed Ones Here!" and displays the geometric-mean-based ones with the heading: "Hottest of the Hot—The Top Ones Tend To Be Newer Songs Loved By Everyone Who's Heard Them!"

Some embodiments display other measures, some of which are more akin to traditional popularity measures, such as ranking the songs according to the number of people who have heard each one or the total number of plays it has received. Some embodiments display such numbers with the data restricted to users associated with the cluster; some do so over the entire population. Any combination of measures can be displayed.

In general, any measure that conveys the degree to which a song is popular or liked can be used. These measures are often most valuable when the input data is restricted to members of the cluster for which they are being displayed. For instance, someone who loves serious, literary folk music may dislike all disco music. If for some reason he downloads a disco song and plays it once, he probably wouldn't play it again. But that should not cause the song to have a low goodness in lists that are displayed in a cluster that appeals to disco lovers.

Note that in some embodiments, there is no time window for the data to be considered by these calculations; in others older data is given less weight according to a decreasing scale, such as using half-life calculations for the data based upon the exponential distribution. (Given a chosen half-life, such as 30 days, one can compute the decay for any point in time using the exponential distribution. For our example, 30 days would have a decay of 0.5; days less than 30 would have decay values between 1 and 0.5; days greater than 30 would have decay values between 0.5 and 0.) This decay is an appropriate weight for the data points. If arithmetic averaging is used, the decay for each ranking is multiplied by the unit ranking. If geometric averaging is used, the unit ranking is used as a power for the ranking. Other decreasing scales may also be used. Different lists may have different scales. For instance, an "Old Reliable" list may have a window of one year, or include all relevant data ever collected, and a "Hottest of the Hot" list for the same cluster may have a window of one week.

Radio

In some embodiments each cluster broadcasts its songs as many services on the Web broadcast songs using such formats as streaming mp3 and Real Audio. In some embodiments the administrator of a cluster can turn this feature on or off for a given cluster.

All-You-Can-Eat Services

At the time of writing of this disclosure, many people in the Internet industry believe that a time will come when users will be able to access any song they want at any time, and either download it or play it in a streaming manner. Napster enables anyone to download any of a very great number of songs at any time for no charge, but its legality is in question because record companies and artists are not being reimbursed. It is generally expected in the industry that paid services will shortly come into existence that give users similar benefits as those provided by Napster today, but legally. It is usually envisioned that a flat fee will be involved, akin to a monthly cable television bill. Cable TV is all-you-can-eat in the sense that for one fixed fee, the consumer gets to watch as much TV as he wants. The expected network-based music services are expected to also be all-you-can-eat in the sense that users can have access to as much music as they want for a fixed fee.

A marketplace may evolve in which artists charge such services different amounts based on their popularity. A relatively unknown artist might charge less than a better-known artist.

The service described in this disclosure can, in such a marketplace, be of use to all-you-can-eat services because the goodness measures can be used to determine who is good, regardless of the present popularity. Thus, an all-you-can-eat service can save money by marketing relatively unknown, but good, artists to its users; the more the users choose to download or listen to lesser-known artists, the more the service saves.

Recommendations

In some cases, users will not want to have to think about clusters. They will simply want recommendations of songs.

Elsewhere in this disclosure means of measuring user-cluster-similarity are discussed. Recommendations are then made, in some embodiments, by finding the cluster(s) most similar to the user, and recommending the best songs in those clusters, according to the goodness measure used by the particular embodiment.

For instance, in some such embodiments, means such as the Ochiai presence/absence index are used to calculate a user-cluster similarity number where a higher value means more similarity, and a goodness calculation within each cluster is also performed, such as using the geometric mean of unit ranks, where a higher value means more goodness. The two numbers are then multiplied; we will call the result the recommendation priority. Recommendations are subsequently made in descending order of the recommendation priority.

If it is desired to give more weight to one of these factors, it can be taken to a power. The power can be tuned over time. One way to do that is to try different values, assigning each value for a significant period of time, such as a month. The more appropriate the power, the higher the following number will be: The average of (the recommendation priority times some passive or active measure of how much the user likes the song). For instance, in embodiments involving Radio UserLand, for each recommended song that the user has not heard before, we multiply the number of times the user actually plays it in the first week after receiving the recommendation by its recommendation priority, and compute the average of those numbers. The higher that average is, the better the weight is. After trying a number of weights over a period of time, the best one is chosen.

Other ways of combining the two numbers for calculating the recommendation priority are used in various other embodiments, such as adding them; and in still further embodiments, other methods are used, such as only picking one cluster for recommendations and then ordering them by goodness.

Artist Tools

Items may be submitted by artists for examination by cluster administrators, possibly leading to ratings, reviews, or other consideration. In some embodiments special forms, such as Web form input, are provided for this purpose.

In preferred embodiments, means are provided to give artists some control over their "persistent reputations" as determined by ratings and reviews. In some such embodiments artists are given means to specify the clusters that may request or display reviews and ratings of their works. In further embodiments, clusters that cannot display or request reviews for an artist cannot receive submissions from him.

In order to assist artists in directing their submissions to appropriate clusters, preferred embodiments provide special tools. Preferred embodiments use taste-based searching. In one such embodiment, a form (such as a Web input form) is provided which allows an artist to list similar artists. The clusters with most-liked-lists with the most artists in common with the artists' list are the best ones to submit to. In a further embodiment, these similar artists are listed in order of similarity. The rankings are then matched against the cluster's rankings on their ranked most-liked-lists using rank correlation. In still another embodiment, artists rate other artists regarding their similarity, and the cluster stores ratings of artist according to their perceived goodness. The scale may be for instance, a 7-point scale from "Excellent" to "Fair" in each case; although in one case similarity to a given artist is measured and in another case "goodness" seems to be measured, in fact the "goodness" measure is really similarity to the tastes of the given cluster. So the clusters with the best matches on these ratings are the ones to submit to in that embodiment. In general, the various techniques mentioned earlier for enabling users to find appropriate clusters may also be used for artists, including deriving lists of songs from the files made available by the artist for file sharing via Napster, Gnutella, or other means, and/or using presence/absence indeces. It should not be construed that this invention is limited to any particular means for taste-based searching.

In some embodiments, artists are given means to indicate that they wish to pay a particular individual to listen to, rate and/or write a review of their work. In some further embodiments, they can read the review and decide whether it is to be displayed online. In some embodiments, means are provided such as online credit card payment or checking account withdrawal through which the individual reviewer can be paid for doing the rating/review. In order to help the artist decide which user to ask for a rating and/or review, users (who may be Administrators or other users), each have information available online which would help to indicate their suitability. First, if they are members or administrators of relevant clusters, that provides a first level of filtering indicating that their tastes are probably consistent with the interests of the artist. In some embodiments, previous reviews by the user are available in one easily-accessed list. In addition, in some embodiments, if the user has entered his own ratings or explicit or implicit list of most-liked-artists, whether ordered or unordered, the artist can use his own similar information (with regard to similarity of various works to the artist's own work or simply with regard to the artist's own personal likes) to request that the system generate a calculated indicator of appropriateness, similar to that used when users are searching for appropriate clusters. In some embodiments artists can search for appropriate users using these means without consideration of clusters.

Features are provided for helping the artist made informed choices about which users to submit their items to for review. In some embodiments, artists are given input means to rate users on their satisfaction with the ratings and reviews they have paid for. Other artists can see summaries of these ratings, for instance, in one embodiment, averages of the ratings, in order to judge who to pay. (For instance, a reviewer may write a negative review but not make it public, and make it a useful critique of the work, which the artist can use in refining his work in the future; such a review might be negative but still valuable.) In some embodiments, users can set their own fees for reviewing and/or listening.

In addition, in some embodiments, a rating reliability number is calculated for users. This allows artists and other users to know how reliable a particular user's ratings are, helping artists judge whether to submit their items for rating and review by a particular user, and helping users decide which other users' ratings and reviews to read. See Appendix A for more detail.

In preferred embodiments, information is not given to the artist that will enable him to choose reviewers who only review highly. For instance, a preferred embodiment only enables artists access to each reviewer's reliability data and cluster membership. Artists will then be motivated to pick reliable reviewers, as compared to reviewers who often disagree with the majority, but they will not have a means to predict reviewers who only rate highly. Of course, in such an embodiment, an identifier for a reviewer that would enable the artist to associate him or her with particular displayed reviews would not be made available.

In a preferred embodiment, the system keeps track of the songs a user has been paid to listen to. It notes that user's relative play frequency for the songs in the weeks immediately after being paid, and the play frequencies in the cluster(s) to which the songs belong after some time has passed, for instance, 6 months, and the songs have had a chance to become known. Then, the rank correlation is calculated between the user's play frequency and the cluster's. This correlation is then used as the basis for recommending people to artists to pay to listen to their songs. To have a high correlation, the user must a) actually listen to the songs he is paid to listen to, and b) judge them similarly, relative to each other, to the way the cluster membership as a whole ultimately judges those same songs relative to each other. This embodiment is particularly appropriate in conjunction with the feature that displays songs ranked according to their average frequency of play among those who have heard the song at all (or other similar features). It means that one user or a small number of users can be paid to hear a song, and if they like it, it will immediately be catupulted to the top of the goodness list for a cluster, encouraging still more people to listen to it, enabling good songs to become popular very quickly.

In some embodiments, artists don't have a choice regarding who they pay. Instead, the artist pays a fee, and the system decides the best people to expose the work to and/or extract ratings from. This simplifies things on a number of levels—there can be a less complicated user interface, and the artist needs to do less work. In some embodiments, artists are presented with information to the effect that, for a certain fixed fee per listener, we will pay as many people as he desires (within limits of availability) to listen. Other embodiments enable listeners to set their fees, and the system chooses based upon the fees and calculated reliability associated with each one.

Various forms of payment can be used in various embodiments. For instance, in some embodiments, money is not transferred, but instead an artist promises to make a certain number (or all) of his future recordings available to the listener for low or no cost.

In some embodiments, an "appropriate submission rating" is associated with each artist. Users rate artists with respect to the appropriateness of submitting the given item to the given user for ratings and review, which depends upon how well the item corresponds to the tastes of the user who is being to rate or review. The idea is to create a persistent record of the appropriateness of an artist's submissions in order to discourage him from "spamming" the clusters by submitting too broadly. Users can see a summary of appropriate submission ratings for the artist in question; in some embodiments this is a simple average; in others, it is a Bayesian estimator of the expected rating; in other embodiments, other summarization methods are used. Similarly, artists can see summaries of the appropriate submission ratings generated by various users; this helps them avoid submitting to users who tend to give inappropriately low ratings.

In some embodiments, there is a new songs list. This list simply lists songs that a relatively new, so that people who are interested in listening to new material can do so. This feature may appear in embodiments which do not contain any features for reimbursing those who listen to songs. In some embodiments where appropriate submission ratings are included, the songs may be listed in order of the measured appropriateness of the artist's past submissions. In further embodiments, artists with the worst appropriateness measures may not be allowed to submit at all. Also, in some embodiments, artists who have submitted a certain number of songs in the past must have achieved a certain measured popularity if they are to be able to continue submitting. For instance, the average number of playings per week of the user's past submissions can be used; if it is below a certain point, no further submissions need be allowed. These calculations can be conducted globally or within the cluster membership. In order to keep this list from becoming too crowded, various means are used, such as always including songs for a limited, fixed set of time.

Importance of the Administrator

In some embodiments, the administrator plays a role much like that of a radio "DJ." The administrator, sometimes called a "guide" in such embodiments, plays a role in which his own personality and tastes given high visibility. For instance, in some such embodiments, the administrator of a cluster is the only person who is enabled to provide ratings and reviews which are visible to visitors and members of the cluster. In such embodiments, administrators of different clusters compete with each other for the reputation of being the best and most reliable raters and reviewers; reliability is measured as discussed elsewhere. In further embodiments, non-administrators can provide ratings and reviews, but these are given subordinate visibility to those generated by the administrator.

System Environment

In various embodiments, the system runs on the World-Wide-Web, client-server systems based on the TCP/IP or other communications protocols, as a multi-user program accessed by users through terminal emulators, or other technical means. In all embodiments, one or more CPU's run the system, and users are enabled to access it from remote sites through an appropriate means of communication.

GLOSSARY

Item: An article of the subject matter covered by a particular system. In various embodiments, an item can be a song, an album, a recording artist, a book, an author, a video, a director, an actor or actress, a painting, etc.

User: A person accessing the system.

Artist: Creator of items. For instance, the artist Herman Melville created the item "Moby Dick."

Cluster: A cluster is primarily defined by its taste. In various embodiments, clusters have associated facilities such as chat rooms, discussion groups, item purchase facilities, etc.

Cluster Visitor: A user who is using the facilities of a cluster but who has not been registered with the cluster as a member.

Cluster Member: A member has registered by indicating that he wants to join the cluster. In some embodiments, his taste is used in refining the taste of the cluster. In various embodiments members have special rights, such as the right to post to a cluster discussion group or the right to take special discounts when making purchases.

Cluster Administrator: The person or group of people who (in some embodiments) defines the taste of the cluster, moderates chat and discussion rooms, sends notices of events, etc. In some further embodiments, the taste defined by the administrator is further refined by members and/or visitors.

Taste of the cluster: In some embodiments, defined by the cluster administrator. In other embodiments, it is specified only by members by such means as averaging ratings for various items in the subject domain; in still other environments tastes specified by the administrator and members are combined to form the taste of the cluster. Tastes are specified and calculated as described in the text of this disclosure.

APPENDIX A

Some mathematical aspects

This appendix discusses aspects of the invention that relate to certain mathematical calculations One problem being addressed is the fact that people can supply ratings that are essentially random (due to not making the effort to provide truly meaningful ratings), or which are consciously destructive or manipulative. For instance, it has been commented that on Amazon.com, every time a new book comes out, the first ratings and reviews are from the author's friends, which are then counteracted with contradictory reviews from his enemies.

The key to solving this problem is to weight each user's ratings according to their reliability. For instance, if the author's friends and enemies are providing ratings simply to satisfy personal needs to help or hurt the author, it would be helpful if those ratings carried a lower weight than those of other users who have a past reputation for responsible, accurate ratings.

A problem solved by this invention is to provide a way to calculate that past reputation.

This reputation can be thought of as the expected "value to the system" of the user's ratings. This is bound up with the degree to which the user's ratings are representative of the real opinions of the population, particularly the population of clusters which are more appreciative of the genre into which the particular artist's work fits.

(To measure the user's overall contribution to the system, we can multiply the expected value of his ratings by the number of his ratings. Users who contribute a large number of valuable [representative] ratings are, in some embodiments, rewarded with a high profile such as presence on a list of people who are especially reliable raters.)

One can measure the representativeness of a user's ratings by calculating the correlation between those ratings and the average ratings of the larger population.

This analysis of measuring the representativeness of a user's ratings has s major limitation, however. It doesn't take into account the fact that a rating has much more value if it is the first rating on an item than if it is the $100^{th}$. The first rating will provide real guidance to those who are wondering whether to download or buy a recording before other ratings have been entered; the $100^{th}$ rating will not change people's actions in a major way. So early ratings add much more actual value to the community. Also, later raters might choose to simply copy earlier raters, so they can mislead any correlation calculations that way.

Therefore, we want to weight earlier ratings more than later ones. The question is, how much more valuable is the $1^{st}$ rating than the second one, and the $2^{nd}$ one more than the $3^{rd}$, etc.?

Let S be the set of all items; let N be the number of all items; for s∈S and $0<i \leq N$, $s_i$ is the ith item. Let u be the user whose rating representativeness we wish to compute.

Let $g_{i,u}$ be the number of ratings received by $s_i$ previous to u's rating. (i.e., if u gives the first rating for item $s_i$, $g_{i,u}$ is 0.) Let $t_i$ be the total number or ratings for the ith item.

Let $r_{i,u}$ be u's rating of the ith item, normalized to the unit interval. Let $a_i$ be the average of the ratings for the ith item other than u's, also normalized to the unit interval.

Let $\lambda_1$ and $\lambda_2$ be constants.

Let $q_u$ be the representativeness of u's ratings, calculated as follows:

$$q_u = \frac{\sum_{i=1}^{N} e^{-\lambda_1 g_{i,u}}(1-e^{-\lambda_2 t_i})|a_i - r_{i,u}|}{\sum_{i=1}^{N} e^{-\lambda_1 g_{i,u}}(1-e^{-\lambda_2 t_i})}.$$

Then $q_u$ is a number on the unit interval which is close to 1 if the u's ratings have tended to be predictive of those of the community as a whole, and 0 if not.

$\lambda_1$ and $\lambda_2$ are tuned for performance. $\lambda_2$ is a parameter of the cumulative exponential distribution determining the rate of "drop-off" associated with the importance of a rating as more ratings for a given item precede u's rating. $\lambda_2$ is a parameter of the cumulative exponential distribution determining the rate at which the drop-off is associated with the number of total ratings. For instance, if there are no ratings for an item other than u's, the rating has no importance in calculating representativeness and is therefore given weight 0. These parameters can be set manually by intuitive understanding of the effect they have on the calculation. In some embodiments they are set by setting up a training situation in which a number of users rate the items without the means to see other people's ratings; furthermore, these users are selected and given financial or other motivation for putting the effort in to input the most accurate ratings they can generate. These controlled ratings are averaged. Then standard computer optimization techniques such as simulated annealing or genetic algorithms are used to determine values for $\lambda_1$ and $\lambda_2$ that optimize the correlation between these averages and $q_u$. $q_u$ is calculated using the entire population of users in usual viewing mode (such that they could see the ratings of other users). In preferred embodiments, tuning activities are carried out within the memberships of individual clusters. That is, the controlled ratings given by members of a cluster are used to tune the parameters relative to the general ratings given by other members of the same cluster. This is carried out for each cluster. If it is deemed that there aren't enough members of some clusters to effectively tune the parameters separately for each cluster, then in such cases the values for $\lambda_1$ and $\lambda_2$ are averaged across all clusters, and clusters without enough members can use those averaged values. In addition, if a given user has created ratings in multiple clusters, some embodiments simply use the average of his representativeness numbers for all clusters as his single viewable representativeness and some clusters display separate representativeness numbers depending on the cluster in which the numbers are being viewed.

The representativeness of a user is then used for various purposes in various embodiments. In some embodiments, it is presented to artists as a reason to pay a particular user to providing ratings and reviews for new items. In further embodiments, it is used as a weight for the user's ratings when calculating overall average ratings for an item. In some embodiments, listings are provided showing the users' rankings as trustworthy raters, giving "ego gratification"; in must such embodiments these numbers are also available when viewing the user's profile, along with other information presented about the user.

It should not be construed that this invention is dependent upon the particular calculation method for representativeness which is described above.

For example, another embodiment uses the following algorithm for computing the representativeness $q_u$ of user u:

Calculate the average rating for each item, not counting u's rating. For each item, rank the population of ratings in order of their distance from the average rating. In embodiments where discrete ratings are used (that is, some small number of rating levels such as "Excellent" to "Poor" rather than a continuous scale), there will be ties. Simply give each rating a random rank to eliminate ties. For instance, if the average rating is 3, and the ratings in order of their distance from the average are, 3, 3, 4, 2, 5, 5, 1, then after randomization one of the 3's, randomly chosen, will have the top rank, the other will have the next highest rank, the 4 will have the third highest rank, etc.

Call the distance from the average, based on these ranks, the "discrete closeness." Label the ranks such that the closest rating has rank 0, the next closest 1, etc., up to N−1, where N is the total number of ratings of the item. Now pick a random number on the interval (0,1). Add it to the discrete closeness. Call this quantity the "real closeness" of user u to the average for the ith item and label it $p_{i,u}$. If user u's ratings are randomly distributed with respect to the average rating for each item, then the population of $p_{i,u}$'s has a uniform distribution on the unit interval.

It can be shown that, due to this, the quantity $$x_u = -2 \sum_{i=1}^{N} \log(1 - p_{i,u})$$

has chi-square distribution with 2N degrees of freedom. A chi-square table can then be used to lookup a p-value, $p'_u$, relative to a given value of $x_u$. The quantity $p_u = 1 - p'_u$ is also a p-value and has a very useful meaning. It approaches 0 when the distance between u's ratings and the averages are consistently close to 0, "consistently" being the key word. Also, as N increases, $p_u$ becomes still closer to 0. It represents the confidence with which we can reject the "null hypothesis" that u's ratings do not have an unusual tendency to agree with the average of the community. So $p_u$ is an excellent indicator of the confidence we should have that user u consistently agrees with the ultimate judgement of the community (in most embodiments, this is the community within a taste cluster).

Preferred embodiments using the chi-square approach also include weights relative to how early u was in rating each item and to take into account the number of ratings for each item. Let $w_{i,u} = e^{-\lambda_1 g_{i,u}} (1 - e^{-\lambda_2 t_i})$, where $g_{i,u}$ and $t_i$ are defined as before. Let $$y_u = \prod_{i=1}^{N} p_{i,u}^{w_{i,u}}.$$

Then $$p'_u = Prob\{y_u \leq b\} = \sum_{i=1}^{N} \frac{b^{1/w_{i,u}}}{d_i},$$

where $$d_i = \frac{(w_{i,u} - w_1)(w_{i,u} - w_2) \ldots (w_{i,u} - w_{i-1})(w_{i,u} - w_{i+1}) \ldots (w_{i,u} - w_N)}{w_{i,u}^{N-1}}$$

We use $p_u = 1 - p'_u$ as the measure of representativeness, with numbers closer to 0 being better, as before.

Finally further embodiments provide weights for one or both of the terms in the expression for $w_{i,u}$. Proper weights can be found using the same procedures as are used for finding $\lambda_1$ and $\lambda_2$; using genetic algorithms and other optimization techniques, in some embodiments all these weights are found at the same time.

In general, in various preferred embodiments of the invention, various algorithms that allow a representativeness number to be calculated which includes the predictive nature of the user's ratings are used, so the invention as a whole has no dependency on any particular method.

When displaying the quantities calculated as the representativeness numbers, preferred embodiments calculate rankings of the various users with respect to those numbers, or percentile rankings, or some other simplifying number, since the representativeness numbers themselves are not intuitively comprehensible to most users.

Another useful feature emerges if we take $g_{i,u}$ to be a measure of elapsed time in days between the public release of an item and the time the user rated it (which can be 0 if the review preceded or coincided with the public release), and $\lambda_2 = \infty$. Then the approaches mentioned above for calculating representativeness can be extended to such situations as measuring the value of a user in predicting the overall long-term sales of particular items (or even to predicting stock market prices and movements and other similar applications).

For instance, in some embodiments, a correspondence is made between ratings and ultimate sales volumes. In one such embodiment, the following algorithm is executed. For each rating level, all items with that average rating (when rounded) are located which have been on sale for a year or longer. Then, within each cluster, average sales volumes for each rating level's items are calculated. Then this correspondence is used to assign "sales ratings" to each item based on the total sales of that particular item; the actual sales are matched to the closest of the rating-associated levels of average sales, and the corresponding rating is used as the sales rating. (If there hasn't yet been enough activity in a particular cluster to conduct this exercise meaningfully, system-wide averages are used.)

In this embodiment $p_{i,u}$ is computed using rankings of distances from the sales rating rather than from the average rating. Then $\lambda 2$ is set to (in other words, the $(1-e^{-\lambda_2 t_i})$ term is set to 1). Then we calculate the representativeness, $p_u$, as before.

As with the case of calculating representativeness with respect to general ratings, it should not be construed that this invention is dependent upon the specific calculations given here for calculating a user's ratings' representativeness with respect to sales; other calculations which accept equivalent information, including the user's ratings, the sales volumes, and time data for ratings and sales (or, equivalently, elapsed time data), outputting a representativeness which involves a predictive component, will also serve the purpose of providing equivalent means for use by the invention overall.

For instance, in some embodiments, a rank-based technique is used for calculating representativeness. In one such embodiment, time data is used to determine the items that the user rated soon after their release (or at or before their release) and that have now been on the market long enough to meaningfully measure sales volumes. These items are used to perform Spearman rank correlation between the user's ratings and general ratings or sales volume; other items are ignored. Other embodiments perform rank correlation based on this restricted sample and separately perform rank correlation upon all items rated by the user, and perform a weighted average on the results.

Note 1: In some embodiments, it is possible for a user to change his review and rating of an item over time, since he may come to feel differently about it with more experience. But for purposes of calculating, his earlier ratings are stored. In preferred such iterations, the last rating of an item entered on the first day that he rated that item is used.

Note 2: In cases where the cluster has too few ratings or sales to do meaningful calculations, "virtual" clusters can be created by combining clusters with similar taste signatures into one larger clusters for purpose of computing representativeness. In preferred such embodiments, clusters are successively added to the original cluster, and the representativeness recalculated as long as the representativeness number continues to rise with each iteration. When it declines, this process ends. The maximum representativeness number obtained in this way is the one assigned to the user.

Note 3: In various embodiments the discussed calculations are conducted at either the "artist level" or "item level". That is, in some embodiments the artists are rated and calculations done from those ratings and in others item ratings are used.

APPENDIX B

Introduction

This brief document presents a methodology for clustering songs by calculating "information transfer" as that value is calculated within the framework of Shannon entropy.

First, we will present a simple clustering algorithm will be presented, and second, we will present Python source code for calculating information transfer between clusters and users. Together, these techniques comprise a complete solution for clustering songs.

Clustering Algorithm

For simplicity, and to maximize the probability of showing that our basic approach can find useful clusters, we will use one of the most simple clustering algorithms possible, which does not contain possible optimizations to improve computational speed.

Here are the steps:

```
For each song not yet assigned clusters (note that the first time the system
is started, this would be all songs):
    Randomly assign a cluster.
Repeat:
    For each song (including new songs not yet added to clusters):
        For each cluster other than the original one the song is in:
            Compute the change in total system information transfer that
            would occur if the song were moved to the other cluster.
        If at least one such potential move would result in an
        increase of information transfer:
            Execute the move that results in the greatest
            increase.
    If no movements occurred in the "For each song" loop:
        Delay until there is a new song to process.
```

The above can continue until we want to bring down the system.

It would be great if an administrator console could see, via the Web, a history of the number of distinct songs moved per hour, so that we can monitor how the system is evolving toward stability. If no songs were moved in recent hours, we know that optimization is complete (of course that will only happen if we stop adding songs).

Calculating Information Transfer

A Python example will be used to describe the algorithm. At the top of the Python listing is a matrix. Each row represents a cluster and each column represents a user. The numbers represent the number of songs in ith cluster that are associated with the jth user. For example the $10^{th}$ user is associated with 3 songs in the 4th cluster. With Radio Userland data, this would mean that the user has played the song.

When a song is moved from one cluster to another, a number of counts in the matrix may be affected, both in the originating cluster and the target cluster, because that song will be associated with a number of users. Subsequently, the clustering algorithm, which must "try" various possible movements to find the best one, will be very computationally expensive. Various tricks can be used to minimize the number of computations to be done; the Python code below uses virtually no such tricks. It would be appropriate for early Java versions to be equally free of optimizations; for one thing, the fewer optimizations, the less chance for bugs to be introduced into the code. Then we can refine from there, always checking to make sure our optimizations don't change the output numbers. We can check this by loading the database with test data, setting the random number generator to a constant seed, and running the algorithm after each enhancement. The resulting clusterings should always be identical after the same number of iterations. NOTE: There should therefore be some easy way to load the same test data into the system repeatedly.

Obviously, a line-by-line conversion to Java probably doesn't make sense. For one thing, an index-based data structure will probably not be appropriate, because the ID's of the users, after filtering, will not be contiguous. And some users may be dropped from the processing over time for one reason or another. So some kind of map structure would seem to be more appropriate. The row-and-column naming convention would therefore probably also not make sense in the Java version.

Note 1: In the initial release, let's count all user-song-associations as being a 1 no matter how many times the user played the song. So, to get a count of 3 in a cell in the matrix, a user must have played 3 distinct songs. Future versions may count each play as a separate association.

Note 2: it is traditional to use log base 2 when doing Shannon entropy calculations, but if there is no log base 2 function in the Java libraries, we can use natural logarithms.

```
PYTHON CODE BEGINS HERE
lstLst = [
    [1, 0, 0, 0, 0, 0, 0, 0, 0, 0, 0, 0, 0, 0, 0, 0, 0, 0, 0, 0, ]]
lstLst.append(
    [0, 1, 1, 1, 0, 0, 0, 0, 0, 0, 0, 0, 0, 0, 0, 0, 0, 0, 0, 0, ])
lstLst.append(
    [0, 0, 0, 0, 1, 1, 1, 0, 0, 0, 0, 0, 0, 0, 0, 0, 0, 0, 0, 0, ])
lstLst.append(
    [0, 0, 0, 0, 0, 0, 0, 1, 9, 3, 1, 0, 0, 0, 0, 0, 0, 0, 0, 0, ])
lstLst.append(
    [0, 0, 0, 0, 0, 0, 0, 0, 0, 9, 1, 1, 1, 1, 1, 1, 0, 0, 0, 0, 0, ])
lstLst.append(
    [0, 0, 0, 0, 0, 0, 0, 0, 0, 0, 1, 0, 0, 0, 0, 0, 1, 1, 1, 0, 0, ])
lstLst.append(
    [0, 0, 0, 0, 0, 0, 0, 0, 0, 0, 0, 0, 0, 0, 0, 0, 0, 0, 1, 1, ])
import math
def minusPLogP(float_):
    """
    Takes a probability associated with a particular value for a
    random variable, and outputs that value's contribution to the
    Shannon entropy.
    """
    if float_ == 0.0:
        return 0
    else:
        return - float_ * math.log(float_)
def countCol( ):
    """
    The number of users.
    """
    return len(lstLst[0])
def countRow( ):
    """
    Return the number of clusters.
    """
    return len(lstLst)
def sumRow(int_row):
    """
    Sums user-song-association instances for a single cluster.
    """
    int_sum = 0
    for int_col in range(countCol( )):
        int_sum = int_sum + lstLst[int_row] [int_col]
    return int_sum
def sumCol(int_col):
    """
    Sums user-song-association instances for a single user.
    """
    int_sum = 0
    for int_row in range(countRow( )):
        int_sum = int_sum + lstLst[int_row] [int_col]
    return int_sum
def sumTotal( ):
    """
    Sums user-song-association instances across the universe.
    """
    int_sum = 0
    for int_row in range (countRow( )):
        for int_col in range (countCol( )):
            int_sum = int_sum + lstLst[int_row] [int_col]
    return int_sum
def userUncertainty( ):
    """
    Loop through the users, calculating the probability,
    p, that a randomly
    chosen user-song-association instance would be associated
    with the user being looped through.
    Then sum p log p for all users.
    That is the Shannon uncertainty for the user population.
    """
    float_sum = 0.0
    int_total = sumTotal( )
    for int_col in range(countCol( )):
        float_p = float(sumCol(int_col)) / int_total
        float_sum = float_sum + minusPLogP(float_p)
    return float_sum
def clusterUncertainty( ):
    """
    Loop through the clusters, calculating the probability, p,
    that a randomly
    chosen user-song-association instance would be associated
    with the cluster being looped through.
    Then sum p log p for all clusters.
    That is the Shannon uncertainty for the cluster population.
    """
    float_sum = 0.0
    int_total = sumTotal( )
    for int_row in range(countRow( )):
        float_p = float(sumRow(int_row)) / int_total
        float_sum = float_sum + minusPLogP(float_p)
    return float_sum
def jointUncertainty( ):
    """
    Loop through all unique combinations of user-cluster,
    calculating the probability, p, that a randomly
    chosen user-song-association instance would be associated
    with the user-cluster combination being looped through.
    Then sum p log p for all user-cluster combinations.
    That is the joint Shannon uncertainty for the cluster population.
    """
    float_sum = 0.0
    int_total = sumTotal( )
    for int_row in range(countRow( )):
        for int_col in range(countCol( )):
            float_p = float(lstLst[int_row] [int_col]) / int_total
            float_sum = float_sum + minusPLogP(float_p)
    return float_sum
def calculateInformationTransfer ( ):
```

-continued

```
"""
    Calculate the information transfer.
"""
    return userUncertainty( ) + clusterUncertainty( ) – jointUncertainty( )
print 'User uncertainty:', userUncertainty( )
print 'Cluster uncertainty:', clusterUncertainty( )
print 'Joint uncertainty:', jointUncertainty( )
print 'Information transfer: ', calculateInformationTransfer( )
```

An Optimization Strategy

This strategy is used by preferred embodiments of the information transfer algorithm.

Add new user-song associations in batches, allowing a significant period of time between each batch.

Since the total that is in the denominator of all the p calculations will not change in between batches, that makes it possible, at the end of a batch load, to create a one-diminsional array to represent the p log p values, where the index is the numerator in the p calculation. Thus, each relevant p log p calculation only needs to be performed once, and is then reused.

Instead of actually re-allocating memory for the array at the end of each batch load, the array can be zeroed out. A 0 in an element indicates that p log p has not yet been calculated. So, when a value is needed for p log p, the appropriate element is checked, and if it is 0, it is calculated. If it is non-zero, then the value that is there is used.

APPENDIX C

```
#VERSION 12 08/27/00
#Copyright (c) 2000 by Virtual Development Corp. All Rights Reserved.
#Usage Notes###########################
# MimimumConvergenceIterations in the Config file must be at least 1. (See BUGS.)
# MinimumConvergenceIterations "beats" MaxTime. It will run for the minimum
#   number of configurations, then run until MaxTime.
# work_ = Work instance
# rel_= Relatable instance
# clus_= Cluster
# clst_= ClusterSet
# clss_= ClusterSetSignature
import whrandom
import math
import xmllib
import copy
import time
import ConfigParser
import urllib
import sys
# Utility stuff
G_generator = whrandom.whrandom( ) # For why global, see
http://starship.python.net/crew/donp/script/sample.py
#G_generator.seed (1, 1, 3)
def shuffle(sample_size):        # See
http://starship.python.net/crew/donp/script/sample.py
    ''' Moses and Oakford algorithm. See Knuth, vol 2, section 3.4.2.
    Returns a random permutation of the integers from 1 to
    sample_size.
    '''
    assert type(sample_size) == type(0) and sample_size > 0
    global G_generator
    list = range(1, sample_size + 1)
    for ix in xrange(sample_size –1, 0, –1):
        rand_int = G_generator.randint(0, ix)
        if rand_int == ix:
            continue
        tmp = list[ix]
        list[ix] = list[rand_int]
        list[rand_int] = tmp
    return list
# from http://starship.python.net/pipermail/python-de/1997q1/000026.html
#"Converter module from strings to HTML entities"
# The code is modified slightly modified to use the encodings
# the python xml parser defaults to decoding, rather than using
# htmlentitydefs.
EntitiesByOrd={ord('<'): 'lt',
    ord('>'): 'gt',
    ord('&'): 'amp',
    ord('"'): 'quot',
    ord ('''): 'apos'}
def toXML(s):
    pos=start=0
    result=" "
    flush=0
    while pos<len(s):
```

-continued

```
        c=ord(s[pos])
        if EntitiesByOrd.has_key(c):
            flush=1
            item="&"+EntitiesByOrd[c] + ";"
        if flush:
            result=result+s [start:pos] + item
            start=pos+1
            flush=0
        pos=pos+1
result=result+s [start:pos]
return result
def computeEvenRankUnitRanks (lstTup__input):
# SHOULD BE IN DATA object
# Suppose 100 values are tied for second place, and 1
# is alone in first. It should not be assumbed that we
# should put the lone value in the top percentile, because
# it could easily be due to noise. So, we compromise by
# saying there are 2 ranks, and we assign .25 to everyone in the low
# and .75 to the one in the high.
# We only use the first element in the tuple for ranking.
# Output list has the same data as the input, but in
# rank order, and each tuple has two extra elements
# at the end: the integer rank (ties are counted as
# the same rank; best is highest) and the unit rank.
# FURTHER ADJUSTMENT DURING TIME OF LITTLE DATA!!!! If
# there are two input sort field values, 1 and 2, the
# original algorithm gives outputs .25 and .75. But that
# still means that the low level is much closer to 0
# than the high level is. That makes no sense.
# So, we change the levels to .625 and .875.
lstTup__input.sort ( )
assert lstTup__input[0] [0] != None # logic assumes first sort value is not None
lstTup__intermediate = [ ]
int__rank = 0
any__previousSortValue = None
for tup__ in lstTup__input:
        if any__previousSortValue != tup__[0]:
            int__rank = int__rank + 1
            any__previousSortValue = tup__[0]
        lstTup__intermediate.append(tup__ + (int__rank,))
lstTup__output = [ ]
for tup__ in lstTup__intermediate:
        float__ = (tup__[-1] − 0.5) / float(int__rank)
        float__tuning = Config.float__tuningRankBottom + float__ * (1.0 −
Config.float__tuningRankBottom) #see note above for little data
        lstTup__output.append(tup__ + (float__tuning,))
return lstTup__output
def computeAverageUnitRanks (lstTup__input):
# NOT USED IN CURRENT CODE 8/24/00
# The first element in the tuple is the only one used
# in the ranking.
# The output list contains tuples identical to the input
# list but with an added element at the end, which is
# the ranking, with dups assigned to the average ranks
# of the dups.
def isLastInDupSet(int__index, lstTup__):
        if len(lstTup__) == int__index + 1:
            return 1
        else:
            if lstTup__[int__index] [0] != lstTup__[int__index + 1] [0]:
             return 1
            else:
             return 0
float__offset = 1.0 / (2.0 * len(lstTup__input))
lstTup__input.sort ( )
lstTup__output = [ ]
int__startDupIndex = 0
int__limitIndex = len(lstTup__input)
lst__currentDupSet = [ ]
for int__index in range(int__limitIndex):
        if isLastInDupSet(int__index, lstTup__input):
            lst__currentDupSet.append(lstTup__input[int__index])
            # Compute average unit rank
            float__averageRank = (int__index + int__startDupIndex ) / 2.0
            float__averageUnitRank = float__offset + float__averageRank / int__limitIndex
            # Add to output list
            for tup__ in lst__currentDupSet:
             lstTup__output.append(tup__ + (float__averageUnitRank,))
            # Set the stage for next iteration
```

-continued

```
                int_startDupIndex = int_index + 1
                lst_currentDupset = [ ]
        else:
                1st_currentDupSet.append(lstTup_input[int_index])
return lstTup_output
# Classes
class Config:
# When an instance is created, the class attributes are populated;
# at that point, the instance itself can be thrown away.
str_clusterFile = None
str_useFile = None
str_oldUseFile = None
int_createClusterCount = None
float_maxTime = None
int_minimumConvergenceIterations = None
str_outClusterFile = None
float_tuningRankBottom = None
float_tuningZeroWeight = None
C_str_configFile = 'clusterconfig.txt'
C_str_sectionName = 'Configuration'
C_str_clusterFile = 'InClusterFile'
C_str_useFile = 'UseFile'
C_str_oldUseFile = 'OldUseFile'
C_str_createClusterCount = 'CreateClusterCount'
C_str_maxTime = 'MaxTime'
C_str_minimumConvergenceIterations = "MinimumConvergenceIterations"
C_str_outClusterFile = 'OutClusterFile'
C_str_tuningRankBottom = 'TuningRankBottom'
C_str_tuningZeroWeight = 'TuningZeroWeight'
def_init_ (self):
        configParser = Configparser.ConfigParser ( )
        configParser.read(Config.C_str_configFile)
        Config.str_clusterFile = configParser.get(Config.C_str_sectionName,
Config.C_str_clusterFile)
        Config.str_useFile = configParser.get(Config.C_str_sectionName,
Config.C_str_useFile)
        Config.str_oldUseFile = configParser.get(Config.C_str_sectionName,
Config.C_str_oldUseFile)
        Config.int_createClusterCount = int(configParser.get(Config.C_str_sectionName,
Config.C_str_createClusterCount))
        Config.float_maxTime = float(configParser.get(Config.C_str_sectionName,
Config.C_str_maxTime))
        Config.int_minimumConvergenceIterations = int(configParser.get(
Config.C_str_sectionName, Config.C_str_minimumConvergenceIterations))
        Config.float_tuningRankBottom = float(configParser.get(Config.C_str_sectionName,
Config.C_str_tuningRankBottom))
        Config.float_tuningZeroWeight = float(configParser.get(Config.C_str_sectionName,
Config.C_str_tuningZeroWeight))
        Config.str_outClusterFile = configParser.get(Config.C_str_sectionName,
Config.C_str_outClusterFile)
class Data:
# This is a singleton. One instance is created, and that creates everything.
# "Longnames" are of the format "Beatles - Hey Jude". The artist and the title separate by
# spacedashspace. Each Work object is uniquely identified by a Longname.
singleton = None
def_init_(self):
        assert not self._class_.singleton
        self._class_.singleton        = self
        self.dictStrDictStrNone_userLongname = { }
        self.dictStrDictStrFloat_longname2Longname1UnitRank        = { }
        self.dictLongnameWork_ = { }
        self.dictStrDictStrInt_longname1Longname2Count = { }
        self.dictStrInt_longnameUniqueCount = { }
        self.lstWork_ = { }
        assert Config.str_useFile
        print 'about to read data'
        self._readUserPlayStats(Config.str_useFile)
        print 'about to generate use counts'
        self._generateUseCounts ( )
        print 'about to generate unit ranks'
        self._generateUnitRanks ( )
def displayCheckingInfo(self):
        dict_russians = self.dictStrDictStrFloat_longname2Longname1UnitRank['Sting - Russians']
        lst_russians = dict_russians.items( )
        lst_russians.sort ( )
        def getWorks (self):
        return self.lstWork_
```

-continued

```
def getUnitRanks(self):
    assert self.dictStrDictStrFloat__longname2Longname1UnitRank
    return self.dictStrDictStrFloat__longname2Longname1UnitRank
def getAssociatedLongnames(self, str__longname):
    assert self.dictStrDictStrFloat__longname2Longname1UnitRank.has__key (str__longname)
    return self.dictStrDictStrFloat__longname2Longname1UnitRank[str__longname].keys( )
def_readUserPlayStats(self, str__fileName):
    if str__fileName[:7] == "http://":
        fil__ = urllib.urlopen(str__fileName)
    else:
        fil__ = open(str__fileName, 'r')
    str__ = fil__.read( )
    fil__.close( )
    class UseListContainerParser1(xmllib.XMLParser): # Embedded class, only used here!
        # THIS LOGIC ASSUMES UNIQUENESS AT USER/SONG LEVEL IN THE INPUT XML FILE!!
        def__init__(self, data__):
            self.str__currentUser = None
            self.data__ = data__
            xmllib.XMLParser.__init__(self)
        def start__entry(self, dict__):
            # str__work is the title of the work, which must be distinguished from Work objects!
            if (self.str__currentUser != 'mike3k@mail.com'
                and self.str__currentUser != 'jake@jspace.org'
                and self.str__currentUser != 'jake@braincase.net'
            if int(dict__['count']) > 1:
                str__artist = intern(dict__['artist'])
                str__work = intern(dict__['work'])
                str__longname = intern('%s - %s' % (str__artist, str__work))
                dict__ = self.data__.dictStrInt__longnameUniqueCount
                if dict__.has__key(str__longname):
                    dict__[str__longname] = dict__[str__longname] + 1
                else:
                    dict__[str__longname] = 1
        def start__useList(self, dict__):
            self.str__currentUser = dict__['user']
    class UseListContainerParser2(xmllib.XMLparser): # Embedded class, only used here!
        def__init__(self, data__):
            self.str__currentUser = None
            self.data__ = data__
            xmllib.XMLparser.__init__(self)
        def start__entry(self, dict__):
            # str__work is the title of the work, which must be distinguished from Work objects!
            str__artist = intern(dict__['artist'])
            str__work = intern(dict__['work'])
            str__longname = intern('%s - %s' % (str__artist, str__work))
            if (self.data__.dictStrInt__LongnameUniqueCount.has__key(str__longname) and
                    self.data__.dictStrInt__longnameUniqueCount[str__longname] > 1):
                if self.data__.dictStrDictStrNone__userLongname.has__key(self.str__currentUser):
                    if self.data__.dictStrDictStrNone__userLongname[self.str__currentUser
].has__key(str__longname):
                        pass    # Already there!
                    else:
                        self.data__.dictStrDictStrNone__userLongname[self.str__currentUser] [
str__longname] = None
                else:
                    self.data__.dictStrDictStrNone__userLongname[self.str__currentUser] = {
str__longname : None}
                if not self.data__.dictLongnameWork__.has__key(str__longname):
                    work__ = Work(str__longname, str__artist, str__work)
                    self.data__.lstWork.append(work__)
                    self.data__.dictLongnameWork__[str__longname] = work__
        def start__useList(self, dict__):
            self.str__currentUser = dict__['user'
    parser__1 = UseListContainerParser1(self)
    parser__1.feed(str__)
    parser__1.close( )
    parser__2 = UseListContainerParser2(self)
    parser__2.feed(str__)
    parser__2.close( )
def_generateUseCounts(self):
    dictStrDictStrInt__longname1Longname2Count = { }
    lstStr__user = self.dictStrDictStrNone__userLongname.keys( )
    int__loopCount = 0
    for str__user in lstStr__user:
        int__loopCount = int__loopCount + 1
```

-continued

```
        int_innerLoopCount = 0
        sys.stdout.flush( )
        for str_longname1 in self.dictStrDictStrNone_userLongname[str_user].keys( ):
            int_innerLoopCount = int_innerLoopCount + 1
#    print 'deep in loop, ', int_innerLoopCount, ' of ',
len(self.dictStrDictStrNone_userLongname[str_user])
        for str_longname2 in self.dictStrDictStrNone_userLongname[str_user].keys( ):
#        if str_longname ! str_longname2: songs played by only 1 user can still be
clustered due
#                        to the user's other choices. . .
not counting cases
#                        where the two are equal would
eliminate them, and
#                        should cause logic that loops
through all of the songs
#                        looking for unitRanks to fail
        if str_longname1 != str_longname2:
          if dictStrDictStrInt_longname1Longname2Count.has_key (str_longname1):
            if dictStrDictStrInt_longname1Longname2Count[str_longname1].has_key(
str_longname2):
                dictStrDictStrInt_longname1Longname2Count[str_longname1] [str_longname2
] = \
                    dictStrDictStrInt_longname1Longname2Count[str_longname1] [
str_longname2] + 1
            else:
                dictStrDictStrInt_longname1Longname2Count[str_longname1] [str_longname2
] = 1
          else:
                dictStrDictstrInt_longname1Longname2Count[str_longname1] = {
str_longname2 : 1}
        self.dictstrDictstrInt_longname1Longname2Count =
dictStrDictStrInt_longname1Longname2Count
   def _generateUnitRanks(self):
        # "Unit ranks" are ranks scaled down to the unit interval. For instance, the lowest
        # rank out of 57 elements is 0, and the highest is 56/57 = .98245614035. But, we
        # also perform averaging, so ranks that extreme should be unusual.
        # Consider longname1 to be a work "associated" with longname2. Longname2 is the
work
        # for which we are generating a profile; this profile involves the
associated
        # Longname1 works.
# That is, a profile for a longname2 would contain all
# the longname1's that are associated with it. For each associated work, considered
across all
        # main works, there is one rank for each main work,
        # that's where the uniform distribution comes from. The alternative would be: for
each main work have
        # one rank for each associated work; then some associated works would NECESSARILY
have very low rank.
        # In contrast, using the approach presented, all associated works CAN have high
rank -- but under
        # the null hypothesis the distribution would be uniform.
        self.dictStrDictStrFloat_longname2Longname1UnitRank = { }
        for str_longname1 in self.dictStrDictStrInt_longname1Longname2Count.keys( ):
            lstTupIntStr_ = [ ]
            dictStrInt_longname2Count = self.dictStrDictStrInt_longname1Longname2Count[
str_longname1]
            for str_longname2 in dictStrInt_longname2Count.keys( ):
                lstTupIntStr_.append((dictStrInt_longname2Count[str_longname2], str_longname2
))
            if str_longname1 == 'Elton John - Levon':
                lstTupIntStr_.sort ( )
            lstTupIntStrIntFloat_ = computeEvenRankUnitRanks(lstTupIntStr_)
            for int_ in range(len(lstTupIntStrIntFloat_)):
                tupIntStrIntFloat_ = lstTupIntStrIntFloat_[int_]
                float_ = tupIntStrIntFloat_[-1]
                str_longname2 = lstTupIntStrIntFloat_[int_] [1]
                if self.dictStrDictStrFloat_longname2Longname1UnitRank.has_key(str_longname2):
                    self.dictStrDictStrFloat_longname2Longname1UnitRank[str_longname2] [
str_longname1] = float_
                else:
                    self.dictStrDictStrFloat_longname2Longname1UnitRank[str_longname2] = {
str_longname1 : float_}
# fil_.close( )
# computeAverageUnitRanks
class Relatable:
  def getName(self):
    assert 0
  def getAssociatedRelatedness(self, str_otherName):
```

-continued

```
    assert 0
  def getAssociatedLongnames(self):
    assert 0
def getOverallRelatedness(self, rel__):
    float__zeroweight = Config.float__tuningZeroWeight
    float__sum = 0.0
    float__divisor = 0.0
    for str__name in self.getAssociatedLongnames( ):
      float__other = rel__.getAssociatedRelatedness(str__name)
      if float__other == None: # Defensive programming
        float__other = 0.0
      if float__other == 0:
        float__weight = float__zeroWeight
      else:
        float__weight = 1.0
      float__divisor = float__divisor + float__weight
      float__self = float(self.getAssociatedRelatedness(str__name)) # Cast is
defensive programming
      float__product = float__self * float__other * float__weight
      float__sum = float__sum + float__product
    if float__divisor:
      float__overallRelatedness = float__sum / float__divisor
    else:
      float__overallRelatedness = 0.0
    return float__overallRelatedness
class Work(Relatable):
    # The xml attribute 'work' is the title of the work, which must be distinguished from
Work objects,
    # which contain artist info as well as title info!
    def __init__(self, str__longname, str__artist, str__work):
      # The "Longname" of the work, for purposes of this program, is the artist + the
work title.
Data.singleton.getAssociatedLongnames(str__longname)
      self.str__longname = str__longname
      self.str__artist = str__artist
      self.str__work = str__work
    def getName(self):
      return self.str__longname
    def getArtist(self):
      return self.str__artist
    def getAssociatedRelatedness(self, str__longname):
      dictStrDictStrFloat__longname2Longname1UnitRank = Data.singleton. getUnitRanks( )
      dict__ = dictStrDictStrFloat__longname2Longname1unitRank # Using intermediate name
just for clarity
      assert dict__.has__key(self.str__longname)
      if dict__(self.str__longname ].has__key(str__longname):
        float__unitRank = dict__[self.str__longname] [str__longname]
      else:
        float__unitRank = 0.0
      return float__unitRank
    def getAssociatedLongnames(self):
      return Data.singleton.getAssociatedLongnames (str__longname)
class Cluster(Relatable):
    # To understand this class, it's important to understand the difference between a
    # cluster's membership list and its profile. Both of them involve a group of
    # objects subclassed from Relatable. But the membership list (self.lstRel__member)
    # determines the objects that are currently members of a cluster; whereas, the
    # profile (self.dictStrFloat__longnameRelatedness) is a description of the current
    # "center"of the cluster for purposes of measuring the distance between the
    # cluster and an object that is a candidate for membership in the cluster.
    # Normally, all candidate objects are assigned to a cluster before the profile
    # is computed; these assignments are based on the old profiles. For instance,
    # when clusters are being generated for the first time, the old profiles are
    # random. When clusters are being regenerated based on old clusters read from
    # an xml disk file, the profiles from the disk file clusters are used as the
    # old profiles.
    str__nextAutomaticName = '1'
    def __init__(self, str__name= None):
      self.lstRel__member = [ ]
      self.dictstrFloat__longnameRelatedness = { }
      if str__name:
        self.str__name = str__name
      else:
        int__= int(self.__class__.str__nextAutomaticName)
        self.str__name = self.__class__.str__nextAutomaticName
        self.__class__.str__nextAutomaticName = str(int__ + 1)
    def getName(self):
      return self.str__name
    def getMembers(self):
```

```
            return self.lstRel__member
        def getAssociatedRelatedness(self, str__longname):
            # 1 or 0
            if self.dictStrFloat__longnameRelatedness.has__key(str__longname):
                return self.dictStrFloat__longnameRelatedness[str.__longname]
            else:
                return 0.0
    def getCountUniqueArtist(self):
        if not self.lstRel__member:
            return 0
        assert self.lstRel__member[0].__class__ == Work
        dict__ = { }
        for work__ in self.lstRel__member:
            dict__[work__.getArtist( )] = None
        return len(dict__)
    def getAssociatedLongnamnes(self):
        return self.dictStrFloat__longnameRelatedness.keys( )
    def addToCluster(self, rel__):
        self.lstRel__member.append(rel__)
    def addToProfile(self, strLongname):
        # Used for initializing empty profile for later clustering.
        self.dictStrFloat__longnameRelatedness[strLongname] = None
    def computeClusterProfile(self, bool__binary):
        # Normally, relatedness of each member to the cluster is binary --
        # 1 if it's in the dict, 0 otherwise. However, in the final
        # cluster confergence, it makes sense to do a 2-stage profile computation;
        # first we compute the binary values (represented by membership in
        # the dict vs. non-membership), then, using those values, we recompute
        # the profile, generating floating point values. This allows
        # us, in the final convergence, to generage clusters in such
        # a way that the most remote profile elements don't hold as great a sway
        # over what potential members are attracted to the cluster.
        # WHILE REVIEWING THIS CODE FOR WORK ON CLUSTERS13, I NOTICED THAT THIS
        # APPARENTLY SHOULD BE STRUCTURED AS: IF BOOL__BINARY. . . ELSE. THIS WOULD
        # AVOID SETTING dictStrFloat__longnameRelatedness TWICE, AS APPARENTLY
        # HAPPENS WITH THE CURRENT CODE. NOT CHANGING NOW BECAUSE AM WORKING
        # ON NEW VERSION AND DO NOT EXPECT TO TEST CHANGES.
        for rel__ in self.lstRel__member:
            if rel__.__class__ == Work:
              self.dictStrFloat__longnameRelatedness[rel__.getName( )] = 1.0
            elif rel__.__class__ == Cluster:
              lstStr__otherName = rel__.getAssociatedLongnames( )
              for str__otherName in lstStr__otherName:
                self.dictStrFloat__longnameRelatedness[str__otherName] = 1.0
            else:
              assert 0 # Attempt to cluster an illegal class
        if not bool__binary:
            for rel__in self.lstRel__member:
                if rel__.__class__ == Work:
                  self.dictStrFloat__longnameRelatedness[rel__.getName( )] =
self.getOverallRelatedness(rel__)
            elif rel__.__class__ == Cluster:
              lstStr__otherName = rel.getAssociatedLongnames( )
              for str__otherName in lstStr__otherName:
                self.dictStrFloat__longnameRelatedness[str__otherName] =
self.getOverallRelatedness(rel__)
            else:
                assert 0 # Attempt to cluster an illegal class
    def makeEmpty(self):
        # Notice that it leaves the profile (self.dictStrFloat__longnameRelatedness) intact
for purposes
        # of getAssociatedRelatedness( ) and getAssociatedLongnames( ).
        self.lstRel__member =[ ]
    def merge(self):
        # Turns a cluster of clusters (each of which must contain works)
        # into a cluster of works
        lstWork__ = [ ]
        for clus__in self.lstRel__member:
          assert clus__.__class__ == Cluster
          for work__ in clus__.getMembers( ):
            assert work__.__class__ == Work
            lstWork__.append(work__)
        self.lstRel__member = lstWork__
class ClusterSet:
    def__init__(self, str__fileName= None, lstClus__persistent=None,
int__randomClusterCount= None):
        # The constructor just loads or creates the clusters, it doesn't
        # do any processing.
        # When constructing from a file, the clusters
```

-continued

```
       # have profiles for measuring relatedness, but have no members.
       # When constructing from a list of clusters, they keep their members.
       # Randomly generated clusters are given members.
       self.lstClus__ = [ ]
       if str__fileName:
       __readUserplayStats(str__fileName)
       elif int__randomClusterCount:
            lstWork__ = Data.singleton.getWorks( )
            int__countWorks = len(lstWork__)
            lstInt__shuffled = shuffle(int__countWorks)
            if int__countWorks < int__randomClusterCount: # Obviously only applicable in small
tests.
            int__randomClusterCount = int__countWorks
            int__numberOfRandomWorksPerCluster = int__countWorks / int__randomClusterCount
            clus__current = None
            for int__ in xrange(int__countWorks):
                 if int__ % int__numberOfRandomWorksPerCluster == 0:
                     if clus__current:       #Skip first iteration
                         clus__current.computeClusterProfile (bool__binary=1)
                     clus__current = Cluster( )
                     self.addToClusterSet(clus__current)
                     clus__current.addToCluster(lstWork__[lstInt__shuffled[int__] − 1])
            clus__current.computeClusterProfile(bool__binary= 1) # May end up doing this
twice for a cluster
       else:
            assert lstClus__persistent
            self.lstClus__ = lstClus__
    def consolidateArtists (self):
       # Move all works for a given artist to the cluster with the greatest
       # concentration of works for that artist.
       # This may not be necessary in implementations where can do all clustering at
artist level.
       dictStrDictClusInt__artistClusterCount = { }
       dict__ = dictStrDictClusInt__artistClusterCount # short handle
       for clus__ in self.lstClus__:
            lstWork__ = clus__.getMembers( )
            for work__ in lstWork__:
              str__artist = work__.getArtist( )
              if dict__.has__key(str__artist):
                if dict__[str__artist].has__key(clus__):
                  dict__[str__artist] [clus__] = dict__[str__artist] [clus__] + 1
                else:
                  dict__[str__artist] [clus__] = 1
              else:
                  dict__[str__artist] = {clus__ : 1}
dictStrClus__artistBestCluster = { }
for str__artist in dict__.keys( ):
clus__bestCluster = None
int__bestCount = 0
for tupClusInt__ in dict__[str__artist].items( ):
    if tupClusInt__[1] > int__bestCount:
         int__bestCount = tupClusInt__[1]
         clus__bestCluster = tupClusInt__[0]
    dictStrClus__artistBestCluster[str__artist] = clus__bestCluster
for clus__ in self.lstClus__:
    clus__.makeEmpty( )
dictStrLstWork__artistWork = { }
for work__ in Data.singleton.getWorks( ):
    str__artist = work.getArtist( )
    if dictStrLstWork__artistWork.has__key(str__artist):
         dictStrLstWork__artistWork[str__artist].append(work__)
    else:
         dictStrLstWork__artistWork[str__artist] = [work__]
for tupStrClus__ in dictStrClus__artistBestClUSter.items( ):
    str__artist = tupStrClus__[0]
    clus__ = tupStrClus__[1]
    for work__ in dictStrLstWork__artistWork[str__artist]:
         clus__.addToCluster(work__)
for clus__ in self.lstClus__:
    clus__.computeClusterProfile ( )
def getAverageSquaredUniqueArtist(self):
    int__sum = 0
    for clus__ in self.lstClus__:
         int__count = clus__.getCountUniqueArtist( )
         int__sum = int__sum + int__count**2.0
    return float(int__sum) / len(self.lstClus__)
def getAverageCountUniqueArtist(self):
    int__sum = 0
    for clus__ in self.lstClus__:
```

```
            int_count = clus_.getCountUniqueArtist( )
            int_sum = int_sum + int_count
        return float(int_sum) / len(self.lstClus_)
    def getMaxCountUniqueArtist(self):
        int_max = 0
        for clus_ in self.lstClus_:
            int_count = clus_.getCountUniqueArtist( )
            if int_count > int_max:
              int_max = int_count
        return int_max
    def getMinCountUniqueArtist(self):
        int_min = len(Data.singleton.getWorks( ))
        for clus_ in self.lstClus_:
            int_count = clus_.getCountUniqueArtist( )
            if int_count < int_min:
              int_min = int_count
        return int_min
    def getMaxClusterSize(self):
        int_maxSize = 0
        for clus_ in self.lstClus_:
            int_size = len(clus_.getMembers( ))
            if int_size > int_maxSize:
              int_maxSize = int_size
        return int_maxSize
    def getSignature(self):
        # Returns a dictionary which is a signature of the cluster
        # Convenient since dicts can be tested for equality, don't need identity
        dictStrDictStrNone_longnameLongname = { }
        for clus_ in self.lstClus:
            str_clusterName = clus.getName( )
            dictStrDictStrNone_longnameLongname[str_clusterName] = { }
            for str_associatedLongname in clus_.getAssociatedLongnames( ):
              dictstrDictStrNone_longnameLongname[str_clusterName] [str_associatedLongname}
= None
        return dictStrDictStrNone_longnameLongname
    def performClustering(self, lstRel_item, bool_recluster=0, bool_binary=1):
        # bool_recluster means recluster items that are already clustered.
        # For defensive programming, we copy the list object (nothing in the list is
copied)
        # so that, when we add to the list below, it doesn't have side effects
        # for calling methods which expect the list to be unmodified
lstRel_itemToCluster = copy.copy(lstRel_item)
if bool_recluster:
        for clus_ in self.lstClus_:
            for rel_ in clus_.getMernbers( ):
              lstRel_itemToCluster.append(rel_)
for clus_ in self.lstClus_:
    clus_.makeEmpty( )       # Leaves profile intact
for rel_ in lstRel_itemToCluster:
    float_bestRelatedness = 0.0       # default to no correlation
    clus_best = None
    for clus_ in self.lstClus_:
        float_currentRelatedness = clus_.getOverallRelatedness(rel_)
        if float_currentRelatedness > float_bestRelatedness:
          float_bestRelatedness = float_currentRelatedness
          clus_best = clus_
    if float_bestRelatedness:    # IF 0 DOES NOT GO INTO A CLUSTER!!
        clus_best.addToCluster(rel_)
    clus_.computeClusterProfile(bool_binary)       # Prepare the cluster
center for use in further correlation
def convergeClusters(self, float_latestTime, int_minimumIterations, bool_binary= 1):
        # float_latestTime is latest time to start an iteration
        float_currentTime = time.time( )
        dict_oldSignature = None
        int_iterations = 0
        bool_done = 0
        while not bool_done:
            if int_iterations < int_minimumIterations or float_currentTime <=
float_latestTime:
            print 'iterating:', int_iterations
            self.performClustering([ [, bool_recluster=1, bool_binary=bool_binary)
            dict_newSignature = self.getSignature( )
            if dict_newSignature == dict_oldSignature:
              print 'finishing convergence due to unchanged signatures'
              bool_done = 1
            else:
              dict_oldSignature = dict_newSignature
              float_currentTime = time.time( )
              int_iterations = int_iterations + 1
```

-continued

```
            else:
                 print 'finishing due to timeout'
                 bool__done = 1
def merge(self):
    for clus__ in self.lstClus__:
        clus.merge( )
def getClusters(self):
    return self.lstClus__
def addToClusterSet(self, clus__):
    self.lstClus__.append(clus__)
def_readUserPlayStats(self, str__fileName):
    # We do not put members into the clusters, we only populate the profiles.
    self.lstClus = [ ]
    fil__ = open(str__fileName, 'r')
    str__ = fil__.read( )
    fil__.close( )
    class ClusterParser(xmllib.XMLParser): # Embedded class, only used here!
        def __init__(self, clst__):
            self.clst__ = clst__
            self.clus__current = None
            xmllib.XMLParser.__init__(self)
        def start__member(self, dict__):
            str__artist = intern(dict__['artist'])
            str__title = intern(dict__['work'])
            tupStrStr__artistTitle = (str__artist, str__title)
            str__longname = intern('%s - %s' % tupStrStr__artistTitle)
            self.clus__current.addToProfile(str__longname)
        def start__cluster(self, dict__):
            self.clus__current = Cluster(dict__['name'])
            clst__.lstClus__.append(clus__current)
    parser__ = ClusterParser(self)
    parser__.feed(str__)
    parser__.close( )
def writeToDisk(self, str__fileName):
    fil__ = open(str__fileName, 'w')
    fil__.write('<?xml version="1.0" encoding="ISO-8859-1"?>\n')
    fil__.write("""<ClusterContainer xmlns:xsi="http://www.w3.org/1999/XMLSchema-
instance"
    xsi:noNamespaceSchemaLocation='ViewListContainer.xsd'>\n""")
    fil__.write('<clusters medium="music">\n')
    for clus__ in self.lstClus__:
        fil__.write('<cluster name="%s">\n' % clus.getName( ))
        lstTup__ = [ ]
        for work__ in clus__.getMembers( ):
            float__relatedness = clus__.getOverallRelatedness(work__)
            tup__ = (float__relatedness, toXML(work__.str__artist), toXML(work__.str__work))
            lstTup.append(tup__)
        lstTup__.sort( )
        lstTup__.reverse( )
        for tup__ in lstTup__:
            fil__.write('<member artist="%s" work="%s" relatedness="%s" />\n' %
(tup__[1], tup__[2 ], tup__[0]))
        fil__.write('</cluster>\n')
    fil__.write('</clusters>\n')
    fil__.write('</ClusterContainer>\n')
    fil__.close( )
###############################################################################
########
# SCRIPT LOGIC
try:
    Config( ) # Get configuration data
    Data( ) # Create data singleton
    if Config.int__createClusterCount:
        # See http://www.math.tau.ac.il/~nin/learn98/idomil/
        int__numberOfClusters = int(Config.int__createClusterCount * math.log(
Config.int__createClusterCount))
    float__maxTime = time.time( ) + Config.float__maxTime
    float__mostFabulous = float(len(Data.singleton.getWorks( )) * len(
Data.singleton.getWorks( )))
    while time.time( ) < float__maxTime:
        float__maxTime1 = (float__maxTime – time.time( )) * .33 + time.time( )
        float__maxTime2 = (float__maxTime – time.time( )) * .66 + time.time( )
        float__maxTime1 = (float__maxTime – time.time( )) * .50 + time.time( )
        float__maxTime2 = (float__maxTime – time.time( )) * 1.0 + time.time( )
        print 'In outer loop ######'
        print 'about to make cluster set'
        clst__1 = ClusterSet(int__randomClusterCount__int__numberOfClusters)
    print 'about to perform first clustering'
    clst__1.performClustering([ [, 1)
```

-continued

```
    print 'about to perform first convergence'
    clst_1.convergeClusters (float_maxTime1, Config.int_minimumConvergenceIterations
)
    lstClus_1 = clst_1.getClusters( )
    clst_2 = ClusterSet(int_randomClusterCount=Config.int_createClusterCount) #A
set of clusters of clusters
    print 'about to perform second clustering'
    clst_2.performClustering(lstClus_1, 0) # Make clusters of clusters
    print 'about to merge'
    clst_2.merge( ) # Change from clusters of clusters to clusters of works
    print 'about to perform second convergence'
    clst_2.convergeClusters (float_maxTime2, Config.int_minimumConvergenceIterations
)
    clst_2.performClustering([ ], 1, bool_binary=0)
    print 'about to perform third convergence'
    clst_2.convergeClusters (float_maxTime1, Config.int_minimumConvergenceIterations,
bool_binary=0
    float_fabulousness = clst_2.getAverageSquaredUniqueArtist ( )
    print 'max unique:', clst_2.getMaxCountUniqueArtist( ), 'min unique:',
clst_2.getMinCountUniqueArtist( )
    print 'avg unique:', clst_2.getAverageCountUniqueArtist( ), 'fabulousness:',
float_fabulousness
    if float_fabulousness < float_mostFabulous:
        fil_ = open('tuninginfo.txt', 'w')
        fil_.write('float_tuningRankBottom:' + str(Config.float_tuningRankBottom) +
'\n')
        fil_.write('float_tuningZeroWeight:' + str(Config.float_tuningZeroWeight) +
'\n')
        fil_.write('float_fabulousness:' + str(float_fabulousness) + '\n')
        fil_.write('clst_2.getMaxCountUniqueArtist( ):' + str(
clst_2.getMaxCountUniqueArtist( )) + '\n')
        fil_.write('clst_2.getMinCountUniqueArtist( ):' +str(
clst_2.getMinCountUniqueArtist( )) + '\n')
        fil_write('clst_2.getAverageCountUniqueArtist( ):' + str(
clst_2.getAverageCountUniqueArtist( )) + '\n')
        fil_.close( )
        print '###FOUND NEW BEST###'
        print 'writing intermediate'
        float_mostFabulous = float_fabulousness
        clst_2.writeToDisk('intermediate.xml')
        clst_best = clst_2
elif Config.str_clusterFile:
    clst_cluster = ClusterSet(str_fileName=Config.str_clusterFile)
        clst_cluster.performClustering(Data.singleton.getWorks( ), 0)
        clst_actual.convergeClusters (Config.float_maxTime + time.time( ),
Config.int_minimumConvergenceIterations)
    else:
        assert 0, 'Invalid config file option'
    clst_best.writeToDisk(Config.str_outClusterFile)
    print 'done!'
except Exception, str_:
    print 'ERROR'
    print str_
    print '\n\nPress any key to abort:'
    sys.stdin.read(1)
```

BIBLIOGRAPHY

Klir, George and Folger, Tina. *Fuzzy Sets, Uncertainty, and Information*. Englewood Cliffs, N.J.: Prentice Hall, 1988.

Manly, Bryan F. J. *Multivariate Statistical Methods, A Primer, Second Edition*. London, England: Chapman & Hall, 1994.

Hedges, Larry V. and Olkin, Ingram. *Statistical Methods for Meta-Analysis*. San Diego, Calif.: Academic Press, 1985.

Snijders, Tom A. B., Maarten Dormaar, Wijbrandt H. van Schuur, Chantal Dijkman-Caes, and Ger Driessen [1990]. "Distribution of Some Similarity Coefficients for Dyadic Banary Data in the Case of Associated Attributes." *Journal of Classification*, 7, pp. 5–31.

http://www.google.com http://www.interbase.com/ http://www.napster.com

The invention claimed is:

1. A method upon a networked computer system including client and server computers for facilitating the creating and optimization of a database system for managing clusters representing a cluster of works, ordered so that the works represented in a given cluster are selected to be consistent with the tastes of a particular plurality of users having similar tastes to one another, said method comprising:

Displaying registration user interface elements for enabling individuals to register where, by becoming users, individuals have the ability to log on from remote client computers to a server computer;

Accepting input through said registration user interface elements whereby a database is updated with logon information for said users;

Displaying logon user interface elements for enabling said users to long on to said networked computer system;

Carrying out logon requests received through said logon user interface elements;

Creating new clusters in the database system, wherein said creating comprises specifying at least one work using at least one from the group consisting of automatically creating clusters in the database system by execution of a cluster creating software algorithm and creating clusters in the database system in accordance with input of logged on users obtained through cluster specification user interface elements;

Receiving suggestions from said users for changing the composition of said clusters such that, overall, individual clusters each better match the tastes of a particular plurality of users;

Executing a software algorithm which determines whether a suggested possible change in the clustering would, overall, better or worsen said clusters' ability to each match the tastes of a particular plurality of users who share similar tastes;

Implementing at least one of said changes in at least one database of the database system; and Displaying selected attributes of selected ones of a plurality of clusters such that said displaying is viewable by a plurality of said users.

2. The method of claim 1, further comprising:

Receiving additional suggestions that are a result of executing software embodying a clustering algorithm which determines potential changes and determines whether, overall, said clusters each better match a particular plurality of users who share similar tastes and which automatically creates clusters which maximize those criteria.

3. The method of claim 2 wherein said software algorithm includes a step for using mutual information as the measure of the degree to which, overall, said clusters each better or worsen said clusters' ability to match the tastes of a particular plurality of users who share similar tastes.

4. The method of claim 2, further comprising:

Collecting submissions of cluster names for said clusters and votes on said cluster names, thereby choosing said cluster names;

Displaying said cluster names for said users.

5. The method of claim 2, further comprising:

Distributing processing for said clustering algorithm across multiple computers.

6. The method according to claim 1, wherein said suggestions are input by users through an HTML interface.

7. The method according to claim 6, wherein said HTML interface is instantiated by remote machines connected via the Internet to a central server computer.

8. The method of claim 1, further comprising:

Supplying by users of cluster descriptions, where said cluster descriptions are generated by a cluster administrator.

9. The method of claim 8, further comprising:

Searching said cluster descriptions in order to cause said clusters which are of interest to be displayed to said users.

10. The method of claim 1, further comprising:

Calculating a goodness which reflects the degree to which users with affinity for a set of similar clusters comprising at least one cluster have particular affinity for particular works in said set of similar clusters, where goodness reflects said affinity.

11. The method of claim 10, further comprising:

Displaying works of high values of said goodness as recommended works.

12. The method of claim 11, further comprising:

Displaying names of said recommended works in the user interface of a physical device which has the ability to play said recommended works;

Thereby enabling a user to choose and play at least one of said recommended works.

13. The method of claim 1, wherein said software algorithm is included in the source of said suggestions.

14. The method of claim 1, further comprising:

Self-selected users interacting with user interface elements to register as members of said clusters.

15. The method of claim 14, further comprising:

Internet chat communications between members of a particular cluster.

16. The method of claim 14, further comprising:

Internet discussion group communications between members of a selected cluster.

17. The method of claim 14, further comprising:

Displaying offers of reduced prices on selected works such that members of a selected cluster are informed that they may buy the works at said reduced prices;

Inputting acceptance of said offers of reduced prices.

18. The method of claim 17, wherein said displaying occurs in the context of an email message.

19. The method of claim 14, wherein said user-interface elements comprise an HTML checkbox.

20. The method of claim 14, wherein said suggestions relative to particular said clusters are restricted such that said suggestions are only received from said members of said clusters.

21. The method of claim 14, further comprising:

Receiving text reviews of works associated with selected said clusters wherein said receiving is restricted such that said text reviews are only received from members of said selected said clusters.

22. The method of claim 14, further comprising:

Selected members receiving administrator privileges;

Receiving text reviews of works associated with selected said clusters wherein said receiving is restricted such that said text reviews are only received from at least one from the group consisting of members of said selected said clusters and administrators of said clusters.

23. The method of claim 1, wherein said cluster creating software algorithm executes in a distributed matter upon a set of computers comprising a plurality of said client computers.

24. The method of claim 1, wherein said cluster creating software algorithm executes on said server computers.

* * * * *